US010148947B2

(12) United States Patent
Laroche et al.

(10) Patent No.: US 10,148,947 B2
(45) Date of Patent: Dec. 4, 2018

(54) METHOD AND DEVICE FOR DETERMINING PARAMETERS FOR ENCODING OR DECODING OF AN IMAGE OF A VIDEO SEQUENCE

(71) Applicant: CANON KABUSHIKI KAISHA, Tokyo (JP)

(72) Inventors: Guillaume Laroche, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 14/354,542

(22) PCT Filed: Oct. 26, 2012

(86) PCT No.: PCT/EP2012/004497
§ 371 (c)(1),
(2) Date: Apr. 25, 2014

(87) PCT Pub. No.: WO2013/060471
PCT Pub. Date: May 2, 2013

(65) Prior Publication Data
US 2014/0241436 A1     Aug. 28, 2014

(30) Foreign Application Priority Data

Oct. 28, 2011  (GB) .................................. 1118705.1
Jan. 19, 2012  (GB) .................................. 1200919.7

(51) Int. Cl.
*H04N 19/51*     (2014.01)
*H04N 19/52*     (2014.01)
(Continued)

(52) U.S. Cl.
CPC ..... *H04N 19/00684* (2013.01); *H04N 19/109* (2014.11); *H04N 19/139* (2014.11);
(Continued)

(58) Field of Classification Search
None
See application file for complete search history.

(56) References Cited

U.S. PATENT DOCUMENTS

2005/0025249 A1* 2/2005 Zhao .................... H04N 19/124
375/240.24
2008/0112481 A1  5/2008 Hsaing et al.
(Continued)

FOREIGN PATENT DOCUMENTS

CN     1622635 A     6/2005
CN     1819658 A     8/2006
(Continued)

OTHER PUBLICATIONS

Tan, et al., "CE9: Skip/Merge Simplification with Reduced Candidate Set (Test L)", Joint Collaborative Team on Video Coding (JCT-VC) of ITU-T SG16 WP3 and ISO/IEC JTC1/SC29/WG11, 5th Meeting: Geneva, CH Mar. 16-23, 2011 Document: JCTVC-E102, XP30008608A, pp. 1-4.
(Continued)

*Primary Examiner* — Kate H Luo
(74) *Attorney, Agent, or Firm* — Canon USA, Inc. I.P. Division

(57) ABSTRACT

A method of and a device for determining encoding parameters for encoding, into a bitstream, a portion of an image of a video sequence, the image portion being encoded by motion compensation with respect to at least one reference image portion, the encoding parameters for encoding the image portion including a coding mode and a motion information predictor, wherein the coding mode is selected from among at least a first coding mode and a second coding mode and wherein the motion information predictor is selected from a set of motion information predictors which is the same for at least the first and the second coding modes, the selection of the coding mode and the motion information predictor involving comparing costs of encoding the image portion using the motion information predictors of the set in the two coding modes, the method comprising or the device comprising means for: omitting, for at least one said motion (Continued)

information predictor of the set, computing of such a cost for at least one of said first and second coding modes. Consequently encoding time and complexity may be reduced and encoding performance may be improved.

29 Claims, 10 Drawing Sheets

(51) Int. Cl.
*H04N 19/139* (2014.01)
*H04N 19/147* (2014.01)
*H04N 19/513* (2014.01)
*H04N 19/109* (2014.01)
*H04N 19/19* (2014.01)

(52) U.S. Cl.
CPC ........... *H04N 19/147* (2014.11); *H04N 19/19* (2014.11); *H04N 19/513* (2014.11); *H04N 19/52* (2014.11)

(56) References Cited

U.S. PATENT DOCUMENTS

| | | | |
|---|---|---|---|
| 2008/0273810 A1 | 11/2008 | Subramania et al. | |
| 2010/0239015 A1* | 9/2010 | Wang | H04N 19/197 375/240.16 |
| 2010/0329341 A1 | 12/2010 | Kam et al. | |
| 2011/0122944 A1* | 5/2011 | Gupta | H04N 19/176 375/240.12 |
| 2011/0150091 A1* | 6/2011 | Young | H04N 19/56 375/240.16 |

FOREIGN PATENT DOCUMENTS

| | | |
|---|---|---|
| CN | 101815215 A | 8/2010 |
| EP | 2106146 A2 | 9/2009 |
| EP | 1790167 B1 | 1/2010 |
| KR | 20110115987 A | 10/2011 |

OTHER PUBLICATIONS

Yin, et al., "Fast mode decision and motion estimation for JVT/H. 264", Proceedings 2003 International COnference on Image Processing (CAT. No. 03CH37429), Barcelona, Spain, Sep. 14-17, 2003; [International Conference on Image Processing], IEEE, IEEE Piscataway, NJ, USA, vol. 3, Sep. 14, 2003 (Sep. 14, 2003), pp. 853-856, XP010669968, ISBN: 978-0-7803-7750-9 section 2. "Fast mode Decision".

Wiegand et al., "WD2: Working Draft 2 of High-Efficiency Video Coding", Joint Collaborative Team on Video Coding (JCT-VC) of ITU-T SG16 WP3 and ISO/IEC JTC1/SC29/WG11, 4th Meeting: Daegu. KR. 20-28 Apr. 15, 2011 (Apr. 15, 2011) Document: JCTVC-D503, XP55057845A, pp. 1-33, Retrieved from the Internet: URL:http://phenix.int-evry.fr/jct/index.php [retrieved on Mar. 26, 2013].

McCann, et al., "High Efficiency Video Coding (HEVC) Test Model 2 (HM2) Encoder Description", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document: JCTVC-D502, XP002679641A, pp. 1-26.

Pan, et al., "Fast Mode Decision Algorithms for Inter/Intra Prediction in H.264 Video Coding", Dec. 11, 2007 (Dec. 11, 2007), Advances in Multimedia Information Processing A PCM 2007; [Lecture Notes in Computer Science], Springer Berlin Heidelberg, Berlin, Heidelberg, pp. 158-167, XP019085493, ISBN: 978-3-540-77254-5.

Laroche, et al., "CE13: Experiment regarding section 3.5", Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G240, XP30110224A, pp. 1-12.

Laroche, et al., "Encoder speed-up for the Motion Vector predictor cost estimation", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC-H0178, XP30111205A, pp. 1-5.

Yang, et al., "Early Skip Detection for HEVC", Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G543, XP30110527A, pp. 1-5.

Laroche, et al., "RD Optimized Coding for Motion Vector Predictor Selection", IEEE Transactions on Circuits and Systems for Video Technology, vol. 18, No. 9, Sep. 1, 2008, pp. 1247-1257.

Examination Report from UK IPO dated Feb. 11, 2015 for GB Application 1200919.7 pp. 1-3.

Jeon, et al., "Fast mode decision for H.264", Joint Video Team (JVT) of ISO/IEC MPEG & ITU-T VCEG, ISO/IEC JTC1/SC29/WG11 and ITU-T SG16 Q.6, 10th Meeting: Waikoloa, Hawaii, USA, Dec. 8-12, 2003.

* cited by examiner

METHOD AND DEVICE FOR DETERMINING PARAMETERS FOR ENCODING OR DECODING OF AN IMAGE OF A VIDEO SEQUENCE

CROSS-REFERENCE TO RELATED APPLICATIONS

The application is the National Phase application of PCT Application No. PCT/EP2012/004497, filed on Oct. 26, 2012 and titled "Method And Device For Determining Parameters For Encoding And Decoding Of An Image Of A Video Sequence." This application claims the benefit under 35 U.S.C. § 119(a)-(d) of United Kingdom Patent Application No. 1200919.7, filed on Jan. 19, 2012 and titled "Method and device for determining parameters for encoding or decoding of an image of a video sequence. " and United Kingdom Patent Application No. 1118705.1, filed on Oct. 26, 2011 and titled "Method and device for determining parameters for encoding or decoding of an image of a video sequence." The above cited patent applications are incorporated herein by reference in their entirety.

The present invention relates to a method and device for determining parameters for the encoding of an image of a video sequence into a bitstream. The invention further concerns a method and device for encoding a sequence of digital images.

The invention may be applied in the field of digital signal processing, and in particular in the field of video compression using motion compensation to reduce spatial and temporal redundancies in video streams.

Many video compression formats, such as for example H.263, H.264, MPEG-1, MPEG-2, MPEG-4, SVC, use block-based discrete cosine transform (DCT) and motion compensation to remove spatial and temporal redundancies. They are often referred to as predictive video formats. Each frame or image of the video signal is divided into slices which are encoded and can be decoded independently. A slice is typically a rectangular portion of the frame, or more generally, a portion of a frame or an entire frame. Further, each slice may be divided into macroblocks (MBs), and each macroblock is further divided into blocks, typically blocks of 64×64, 32×32, 16×16 or 8×8 pixels.

In High Efficiency Video Coding (HEVC) blocks of from 64×64, to 4×4 are used. The partitioning is organized according to a quad-tree structure based on the largest coding unit (LCU). An LCU corresponds to a square block of 64×64. If an LCU needs to be divided, a split flag indicates that the LCU is split into 4 32×32 blocks. In the same way, if any of these 4 blocks need to be split, the split flag is set to true and the 32×32 block is divided into 4 16×16 blocks. etc.

When a split flag is set to false, the current block is a coding unit CU. A CU has a size equal to 64×64, 32×32, 16×16 or 8×8 pixels.

Each CU has a coding mode: Skip, Merge, Inter or Intra as will be later described. For Merge, or Inter coding this coding unit can be divided into two prediction units (PU). Thus, for Merge and Inter modes, the coding unit can be predicted by one 2N×2N PU or by 2 PUs with the following partitioning: N×2N, 2N×N, N×N, nL×2N, nR×2N, 2N×nT and 2N×nB as depicted in FIG. 10. For Skip mode, only the 2N×2N partitioning is enabled.

There are two families of coding modes for coding blocks of an image: coding modes based on spatial prediction, referred to as INTRA prediction and modes based on temporal prediction (INTER, Merge, Skip). In both spatial and temporal prediction modes, a residual is computed by subtracting the prediction from the original block.

An INTRA block is generally predicted by an INTRA prediction process from the encoded pixels at its causal boundary. In INTRA prediction, a prediction direction is encoded.

Temporal prediction consists in finding in a reference frame, either a previous or a future frame of the video sequence, an image portion or reference area which is the closest to the block to be encoded. This step is typically known as motion estimation. Next, the block to be encoded is predicted using the reference area in a step typically referred to as motion compensation—the difference between the block to be encoded and the reference portion is encoded, along with an item of motion information relative to the motion vector which indicates the reference area to use for motion compensation. In temporal prediction, at least one motion vector is encoded.

In order to further reduce the cost of encoding motion information, rather than directly encoding a motion vector, assuming that motion is homogeneous the motion vector may be encoded in terms of a difference between the motion vector and a motion vector predictor, typically computed from one or more motion vectors of the blocks surrounding the block to be encoded.

In H.264, for instance motion vectors are encoded with respect to a median predictor computed from the motion vectors situated in a causal neighbourhood of the block to be encoded, for example from the three blocks situated above and to the left of the block to be encoded. Only the difference, referred to as a residual motion vector, between the median predictor and the current block motion vector is encoded in the bitstream to reduce the encoding cost.

Encoding using residual motion vectors saves some bitrate, but necessitates that the decoder performs the same computation of the motion vector predictor in order to decode the value of the motion vector of a block to be decoded.

Recently, further improvements in coding efficiency have been proposed, such as using a plurality of potential motion vector predictors. This method, often referred to as motion vector competition (MVCOMP), consists in determining from among several motion vector predictor candidates which motion vector predictor candidate minimizes the encoding cost. This cost is typically a rate-distortion cost of the residual motion information. The residual motion information in such a process comprises the residual motion vector, i.e. the difference between the actual motion vector of the block to be encoded and the selected motion vector predictor, and where necessary an item of information indicating the selected motion vector predictor, such as for example an encoded value of the index of the selected motion vector predictor. The index of the selected motion vector predictor is coded in the bitstream with a unary max code based on a fixed list size. Further improvements are obtained when all the motion vector candidates are equal. In such a case, a decoder is able to infer the motion vector predictor value and as a consequence no index needs to be encoded.

In High Efficiency Video Coding (HEVC), a new implementation of the same concept for enabling the selection of the best predictor, from a given set of predictors composed of spatial motion vectors and temporal motion vectors, has been proposed. This technique is referred to as Advanced Motion Vector Prediction (AMVP) and may be applied to Inter, Merge and Skip modes. The method allows the selection of the best predictor from a given set, where the set is composed of spatial motion vectors and temporal motion vectors. The number of spatial and temporal predictors of the set for optimal performance is evaluated. For instance one known implementation of HEVC includes 2 spatial predictors and one temporal collocated predictor.

In the HEVC standard, three Inter coding modes, as previously mentioned, are defined: Inter mode, Merge mode and Skip mode. The differences between these modes are the kind of information transmitted and the partition size used.

In an Inter mode, all data are coded. The reference frame index of the motion vector is coded, and the predictor index of the motion vector is also coded. The current implementation of HEVC draft standard uses 2 motion vector predictors. Thus, the predictor index can be coded with 1 bit. The motion vector of an Inter block is predicted by the selected predictor and the motion vector residual (the motion vector difference between the motion and its predictor) is coded. For the motion vector residual, vertical and horizontal components are coded separately. The texture residual is also coded (transformed and quantized) if needed. The texture residual is the difference between the original current block and the block predictor pointed to by the motion vector in the reference frame index.

Bi-directional Inter prediction uses 2 block predictors for motion compensation while 1 block is used for uni-directional prediction. The final block predictor for bi-directional prediction is the average of the 2 block predictors. The 2 blocks come from two lists of reference frames referred to as L0 and L1 (one list for each "direction").

When bi-directional prediction is enabled for a slice, the type of directional prediction (Bi or uni) is explicitly coded for each Inter block. For uni-directional prediction when bi-directional prediction is enabled, the list (L0 or L1) used for uni direction is also coded for each Inter block that uses uni-directional direction. When the Inter block is a bi-directional block, the list index does not need to be coded because both lists are used. However, two sets of motion information, corresponding to each block predictor need to be transmitted. Thus for each list L0 and L1, one reference frame index is coded, as well as one motion vector predictor and one motion vector residual.

In the HEVC draft standard, the Inter mode is available for all block partitions. So for a CU, all PUs are coded in Inter mode.

The Merge mode is a particular type of Inter coding. In the Merge mode, only the predictor index and its related texture residual (if needed) are coded. Compared to the Inter mode, the prediction type (uni or bi-directional), the list index for uni-directional prediction, the reference frame index and the motion vector residual are not coded. The Merge mode has 5 possible predictors. In the HEVC draft standard, the predictor index is coded with a unary max code with a max value equal to 5. The main difference compared to the Inter mode is the predictor derivation. A Merge predictor is not only a motion vector value but a predictor for all motion vector information including the reference frame and list index. The predictors are derived from existing spatial neighboring motion vectors and temporal motion vectors. Moreover, the type of the Inter prediction (bi or uni-directional), the list index and the reference frame index are derived from the spatial neighbouring blocks.

The Merge mode may be applied for all block partitions. Thus for a Merge coding unit, all PUs may be coded in Merge mode.

A Skip mode, is a particular type of Merge mode coding. The Skip mode uses exactly the same list of motion vector predictors as the Merge mode. As for the Merge mode, only the predictor index from among 5 potential candidates is coded. This predictor is a predictor of all motion information. The main difference compared to the Merge mode is that no texture residual is coded.

The Skip mode is only applied for 2N×2N partitioning and not for all blocks sizes as in the case of Inter and Merge mode. Thus for a Skip CU, the CU partitioning does not need to be coded as compared to Merge and Inter modes.

FIG. 1 illustrates a selection process in a HEVC encoder for selection of the best prediction mode and the best candidate for a motion vector predictor.

In an initial step 101 a list a candidate motion vector predictors is determined. These motion vector predictors can be spatial or temporal predictors. This means that they correspond to motion vectors of already coded Coding Units. For example, motion vectors of the Coding Unit located above the current one or located on the left side are used.

Next, the process of selection is initialized in step 102 by setting the candidate index i to i=0 to index the first candidate in the list. The candidate with index i is then extracted in step 103. The rate distortion cost for the Skip mode associated with the $i^{th}$ candidate is computed in step 105. The rate distortion cost represents the compromise between the video sequence and the rate in bits to encode the video sequence. In general, the Rate-distortion cost J is determined using a Lagrangian expression:

$$J=D(i)+\lambda R(i) \quad (1)$$

where D corresponds to the distortion introduced on the coding unit, R denotes the rate associated with this coding unit and λ denotes the Lagrangian parameter which is fixed to a given value.

Thus during step 105, the rate distortion cost of the Skip mode is determined as $$J\text{Skip}(i)=D\text{Skip}(i)+\lambda R\text{Skip}(i) \quad (2)$$

This means that in the case of the Skip mode, the predictor is used for motion compensation and no additional data are used. The rate RSkip(i) associated with the Skip mode is low since it globally corresponds to the predictor index coding.

After using this predictor for motion compensation, the distortion DSkip(i) is determined by computing for example the mean square error between this Coding Unit and the corresponding block in the original image.

In a similar way, the same predictor candidate indexed by i is evaluated for the Merge mode according to an equivalent expression in step 106:

$$J\text{Mrg}(i)=D\text{Mrg}(i)+\lambda R\text{Mrg}(i) \quad (3)$$

In this case, the computation is much time consuming since for the Merge mode a texture residual data is computed. This means that after motion compensation, the difference between the predicted Coding Unit and the original data corresponding to the coding unit is first transformed then quantized and finally entropy coded. In the particular case of HEVC, a quad tree of transforms is evaluated for the Merge mode: this considerably increases the time for determining the cost for the Merge mode of one predictor.

Next in step 107 a comparison is performed to find the minimum value of the rate-distortion cost between the rate-distortion cost determined for the Merge mode in step 106 and the rate distortion cost determined for the Skip mode determined in step 105.

In step 108, a counter related to the index i the predictor candidate is incremented.

A check is then performed in step 109 in order to determine if all the predictor candidates of the list of N motion vector predictor candidates have been processed.

If it is determined that all N motion vector predictor candidates have not yet been processed, the process returns to step 103 to extract the next motion vector predictor candidate in the list of motion vector candidates for processing.

If otherwise it is determined in step 109 that all of the N motion vector predictor candidates have been processed, the process proceeds to step 110 which corresponds to the output of the selection algorithm. As an output of the selection process, the best predictor $i_{min}$ is identified. The best predictor corresponds to the predictor candidate, from among all N predictor candidates, which gave the minimum cost J. The outcome also provides the best mode BM between the Skip mode and the Merge mode providing the minimum cost for the $i_{min}$ candidate.

In the process described above, the rate-distortion cost of each motion vector predictor candidate in the list is evaluated for both for the Skip mode and the Merge mode. This evaluation is quite costly since each candidate of this list is evaluated. This is particularly true in the case of the Merge mode, since after motion vector (MV) prediction, a step determining the best residual encoding based on a transform quad-tree is performed.

The motion vector derivation for Inter or Merge modes thus has a significant impact on encoding and decoding complexity compared to the Skip modes. Indeed, for the current HEVC motion vector derivation, each predictor position (above, left, temporal, below left, above right) needs to be derived. Such derivation processes implies memory accesses and scalings, that are quite costly in terms of computation.

Moreover, on the encoding side, each predictor is tested and compared to other predictors of a given list to find the best predictor. This means that after selecting one predictor, residual data corresponding to the difference between the prediction and the original signal is computed. This texture residual data is then transformed and quantized. This step of texture residual coding is particularly complex since several types of transform are tested. The complexity thus depends on the number of candidates to evaluate.

At the end of the process, the best predictor is found by minimizing a cost function taking into account the rate corresponding to this predictor and the distortion generated by this predictor.

Many algorithms have been proposed to reduce the coding possibilities tested at the encoder side. An early termination algorithm is one such approach. The main idea is to test one or more possibilities for a block and to stop looking for a better coding possibility as soon as a RD cost of one possibility is found to be below a threshold value.

FIG. 2 illustrates an early termination algorithm for selection of a coding mode corresponding to an H.264 video encoder. In a H.264 specification, only one motion vector predictor is considered for the Inter mode and one for the Skip mode. The motion vector predictor is based on the median value of the neighbouring blocks but it is not exactly the same for the Skip mode and the Inter mode. In this simple embodiment of an early termination rule for H.264, it is considered that only one block size is tested at encoder side. Thus in this example, the encoder selects the best encoding mode for one block or coding unit. It may be noted that in H.264, the Merge mode does not exist and was only introduced recently in the course of the HEVC standardization.

In a first step 201, the encoder derives a Skip mode. In step 202, the best RD cost for the Skip mode is determined. Next, in step 203, an early decision step compares the RD cost with a predetermined first threshold threshold_1. If it is determined that this RD cost is lower than this first threshold, the Skip mode is selected as the encoded mode for the current block. In step 209, the encoder encodes the current block with the Skip mode and goes to the next step. Otherwise, if it is determined that the computed RD cost is higher than a predetermined first threshold the encoder derives the Inter mode in step 204 and computes its RD cost in step 205. In step 206, the computed Inter RD cost is compared with a second predetermined threshold, threshold_2. If the computed Inter RD cost is lower than the second threshold, the encoder selects the Inter mode as the best mode for encoding the current block in step 209. Otherwise, the encoder derives an Intra mode prediction in step 207 and computes the best related RD cost in step 208. At this step, all coding possibilities have been tested. The encoder selects the mode out of the three modes which gives the best RD cost for encoding of the block in step 209.

A drawback of the described method that it only takes into account one candidate for each coding mode and is not adapted to recently-evolved coding methods.

The present invention has been devised to address one or more of the foregoing concerns.

According to a first aspect of the invention there is provided a method of determining encoding parameters for encoding, into a bitstream, a portion of an image of a video sequence, the image portion being encoded by motion compensation with respect to at least one reference image portion, the encoding parameters for encoding the image portion including a coding mode and a motion information predictor, wherein the coding mode is selected from among at least a first coding mode and a second coding mode and wherein the motion information predictor is selected from a set of motion information predictors which is the same for at least the first and the second coding modes, the selection of the coding mode and the motion information predictor involving comparing costs of encoding the image portion using the motion information predictors of the set in the two coding modes, the method comprising: omitting, for at least one said motion information predictor of the set, computing of such a cost for at least one of said first and second coding modes.

By omitting for at least one motion information predictor of the set the computation of the cost for one of the coding modes, the complexity of the encoding process may be reduced and encoding performances may be improved.

In an embodiment the method further includes detecting when at least one condition relating to one or more motion information predictors of the set, or relating to one or more costs already computed, is met; and if it is detected that the condition is met, omitting the computing of the first-coding-mode cost and/or the second-coding-mode cost for at least one said motion information predictor of the set, and otherwise carrying out the computing of the cost concerned.

In an embodiment, the, or one, said condition is that a first motion information predictor in said set is a zero vector.

In an embodiment, if it is detected that the condition is met, the computing of the second-coding-mode cost is omitted for all motion information predictors except for said first motion information predictor.

In an embodiment, the, or one, said condition is that, for one of the motion information predictors of the set, the second-coding-mode cost is greater than the first-codingmode cost. In this embodiment, this condition may depend on the usage of residual texture data by the second coding mode.

In an embodiment, the, or one, said condition is that, for one of the motion information predictors of the set, the second-coding-mode cost exceeds the first-coding-mode cost by more than a predetermined amount.

In an embodiment, if it is detected that the condition is met, the computing of the second-coding-mode cost is omitted for all motion information predictors following said one motion information predictor meeting said condition.

In an embodiment, the method further includes computing the costs for the motion information predictors of said set sequentially starting from a first motion information predictor of the set.

In a particular embodiment the method includes: computing both said first-coding-mode cost and said second-coding-mode cost for a motion information predictor when said condition is not met or, if there is more than one condition, none of the conditions is met; and computing the first-coding-mode cost but not the second-coding-mode cost for a motion information predictor when it is detected that the or one said condition is met.

In an embodiment, each said cost is a rate-distortion cost.

A further aspect of the invention provides a method of determining encoding parameters for encoding, into a bitstream, a portion of an image of a video sequence, the image portion being encoded by motion compensation with respect to at least one reference image portion, the encoding parameters for encoding the image portion including a coding mode and a motion information predictor, wherein the coding mode is selected from among at least a first coding mode and a second coding mode and wherein the motion information predictor is selected from a set of motion information predictors, each motion information predictor of the set being adapted for use in encoding of the image portion by motion compensation in at least the first and the second coding modes, the method comprising: determining a first cost parameter value, representative of a cost of encoding the image portion using the first coding mode, for each of a number of motion information predictors of the set; determining a second cost parameter value, representative of a cost of encoding the image portion using the second coding mode, for part of the number of motion information predictors for which the first cost parameter value is determined; selecting a coding mode and a motion information predictor corresponding to the minimum cost parameter value from among the determined first and second cost parameter values.

By reducing the number of computations of the cost for one of the coding modes, the complexity of the encoding process may be reduced and encoding performances may be improved.

In an embodiment, the motion information predictors are arranged in the set according to a predetermined order.

In an embodiment, the first cost parameter value is determined for the motion information predictors of the set until a first predetermined condition is met. In a particular embodiment the first cost parameter is determined for the motion information predictors of the set, in accordance with the predetermined order until a first predetermined condition is met.

In an embodiment, the second cost parameter value is determined for the motion information predictors of the set taken in accordance with the predetermined order until a second predetermined condition is met.

In an embodiment, the first cost parameter values for the number of motion information predictors are determined sequentially before the determining of the second cost parameter values for the part of the number of motion information predictors.

In an embodiment, the first cost parameter values and the second cost parameter values for the part of the number of motion information predictors are determined in parallel, motion information predictor by motion information predictor.

In an embodiment, the first predetermined condition is that a first cost parameter value has been determined for each of the motion information predictors of the entire set.

In an embodiment, the second predetermined condition is that:
(i) a motion information predictor has a predetermined index and is a zero vector; or
(ii) the value of the first cost parameter determined for a motion predictor is indicative of an inferior cost than the respective value of the second cost parameter determined for said motion predictor.

In an embodiment, the predetermined index indicates that the said motion information predictor is the first motion information predictor of the set.

In an embodiment, the first cost parameter and the second cost parameter are each representative of a rate distortion cost.

In an embodiment, in the first coding mode only an index of the motion information predictor is encoded into the bitstream.

In an embodiment, in the second coding mode an identifier of the motion information predictor and texture residual information representative of a difference between the image portion and the reference image portion, are encoded into the bitstream.

In an embodiment, the first coding mode is a skip type inter coding mode and the second coding mode is a merge type inter coding mode.

In an embodiment, wherein the second cost parameter value is determined until either the second predetermined condition is met or a further second predetermined condition is met by the said motion information predictor, wherein the second predetermined condition is that the said motion information predictor has a predetermined index and is a zero vector; and the further second predetermined condition is that the value of the first cost parameter determined for the said motion predictor of the set is indicative of an inferior cost than the respective value of the second cost parameter for the said motion predictor.

According to a another aspect of the invention there is provided a method of determining encoding parameters for encoding, into a bitstream, a portion of an image of a video sequence, the image portion being encoded by motion compensation with respect to at least one reference image portion, the encoding parameters for encoding the image portion including a coding mode and a motion information predictor, wherein the coding mode is selected from among at least a first coding mode and a second coding mode and wherein the motion information predictor is selected from a set of motion information predictors, each motion information predictor being adapted for use in encoding of the image portion by motion compensation in at least the first and the second coding modes, the method comprising:

determining a first cost parameter value, representative of a cost of encoding the image portion using the first coding mode, for each of a number of motion information predictors of the set, until a first predetermined condition is met;

determining a second cost parameter value, representative of a cost of encoding the image portion using the second coding mode, for each of a number of motion information predictors of the set, until a second predetermined condition is met by a said motion information predictor of the set, and selecting a coding mode and a motion information predictor corresponding to the minimum cost parameter value from among the determined first and second cost parameter values.

Consequently, by terminating the determination of computational costs for the second coding mode once a predetermined condition has been met by one of the motion information predictors encoding time and complexity may be reduced thereby improving video coding performances.

In a particular embodiment the second predetermined condition is that:

(i) the said motion information predictor has a predetermined index and is a zero vector; or (ii) the value of the first cost parameter determined for the said motion predictor is indicative of an inferior cost than the respective value of the second cost parameter determined for the said motion predictor of the set. The first predetermined condition may be that a first cost parameter value has been determined for each of the motion information predictors of the entire set, for example.

The steps of determining the first cost parameter value and the second cost parameter values may be performed in parallel or sequentially. In a preferred embodiment the first cost parameter value and the second cost parameter value is computed candidate by candidate. The motion information predictor may be a motion vector predictor.

A further aspect of the invention provides a method of encoding a portion of an image into a bitstream, the method comprising determining encoding parameters for encoding the image portion by motion compensation with respect to a reference image portion, according to the method of any one of the previous embodiments; and encoding the image portion using the determined encoding parameters A further aspect of the invention provides a device for determining encoding parameters for encoding, into a bitstream, a portion of an image of a video sequence, the image portion being encoded by motion compensation with respect to at least one reference image portion, the encoding parameters for encoding the image portion including a coding mode and a motion information predictor, the device comprising selection means for selecting the coding mode from among at least a first coding mode and a second coding mode and for selecting the motion information predictor from a set of motion information predictors which is the same for at least the first and the second coding modes, the selection being based on costs of encoding the image portion using the motion information predictors of the set in the two coding modes; and processing means for computing said costs of encoding the image portion using the motion information predictors of the set in the two coding modes and being configured to omit, for at least one said motion information predictor of the set, computing of such a cost for at least one of said first and second coding modes.

Another aspect of the invention provides a device for determining encoding parameters for encoding, into a bitstream, a portion of an image of a video sequence, the image portion being encoded by motion compensation with respect to at least one reference image portion, the encoding parameters for encoding the image portion including a coding mode and a motion information predictor, the device comprising selection means for selecting the coding mode from among at least a first coding mode and a second coding mode and the motion information predictor from a set of motion information predictors, each motion information predictor of the set being adapted for use in encoding of the image portion by motion compensation in at least the first and the second coding modes, the device further comprising processing means for: determining a first cost parameter value, representative of a cost of encoding the image portion using the first coding mode, for each of a number of motion information predictors of the set; and determining a second cost parameter value, representative of a cost of encoding the image portion using the second coding mode, for part of the number of motion information predictors for which the first cost parameter value is determined; wherein the selection means is configured to select a coding mode and a motion information predictor corresponding to the minimum cost parameter value from among the determined first and second cost parameter values.

A further aspect of the invention provides a device for determining encoding parameters for encoding, into a bitstream, a portion of an image of a video sequence, the image portion being encoded by motion compensation with respect to at least one reference image portion, the encoding parameters for encoding the image portion including a coding mode and a motion information predictor, wherein the coding mode is selected from among at least a first coding mode and a second coding mode and wherein the motion information predictor is selected from a set of motion information predictors adapted for use in encoding of the image portion by motion compensation in at least the first and the second coding modes, the device comprising: processing means for determining a first cost parameter value, representative of a cost of encoding the image portion using the first coding mode, for each of a number of motion information predictors of the set, until a first predetermined condition is met; and determining a second cost parameter value, representative of a cost of encoding the image portion using the second coding mode, for each of a number of motion information predictors of the set, until a second predetermined condition is met by a said motion information predictor of the set, and selection means for selecting a coding mode and a motion information predictor corresponding to the minimum cost parameter value from among the determined first and second cost parameter values.

In a particular embodiment the second predetermined condition is that the said motion information predictor has a predetermined index and is a zero vector; or the value of the second cost parameter determined for the said motion predictor is indicative of a greater cost than the respective value of the first cost parameter determined for the said motion predictor of the set; The first predetermined condition may be that all of the cost parameter value has been determined for each of the motion information predictors of the entire set.

Another aspect of the invention provides an encoder for encoding a portion of an image into a bitstream, the method comprising a device, according to the device of the previous embodiments for determining encoding parameters for encoding the image portion by motion compensation with respect to a reference image portion; and encoding means for encoding the image portion using the determined encoding parameters.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which:—

Figure 3:
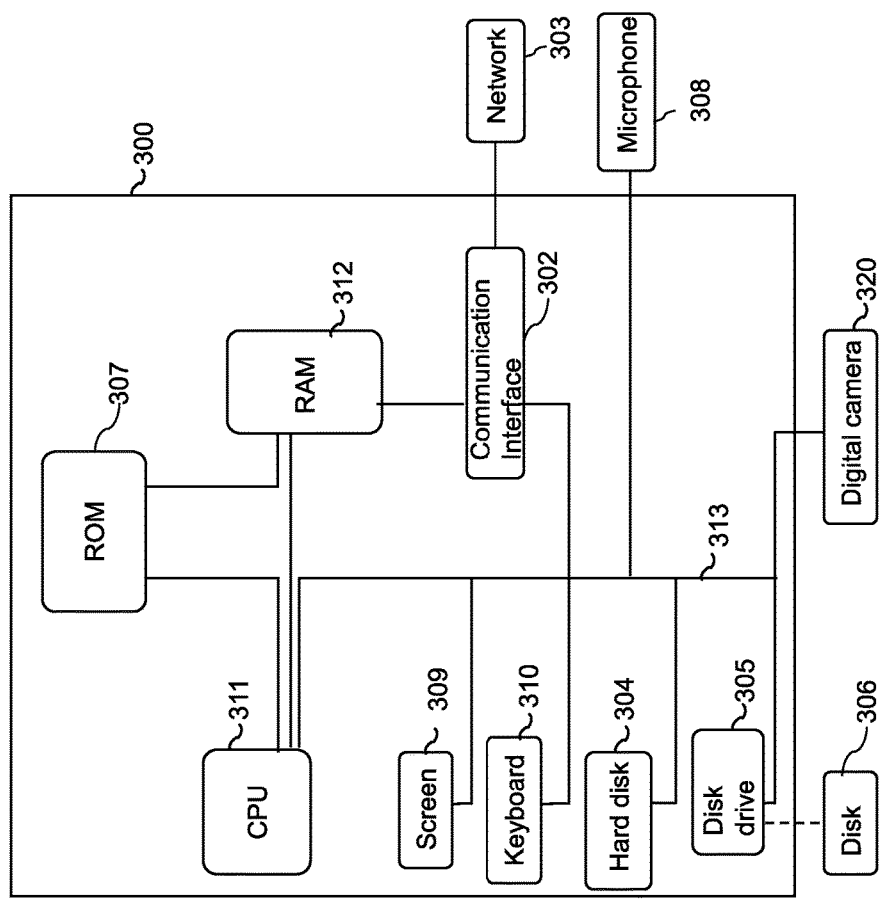
FIG. 3 is a block diagram illustrating components of a processing device in which embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:
- a central processing unit 311, such as a microprocessor, denoted CPU;
- a read only memory 307, denoted ROM, for storing computer programs for implementing the invention;
- a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 302 connected to a communication network 303 over which digital data to be processed are transmitted or received Optionally, the apparatus 300 may also include the following components:
- a data storage means 304 such as a hard disk, for storing computer programs for implementing methods of one or more embodiments of the invention and data used or produced during the implementation of one or more embodiments of the invention;
- a disk drive 305 for a disk 306, the disk drive being adapted to read data from the disk 306 or to write data onto said disk;
- a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 307, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 307, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
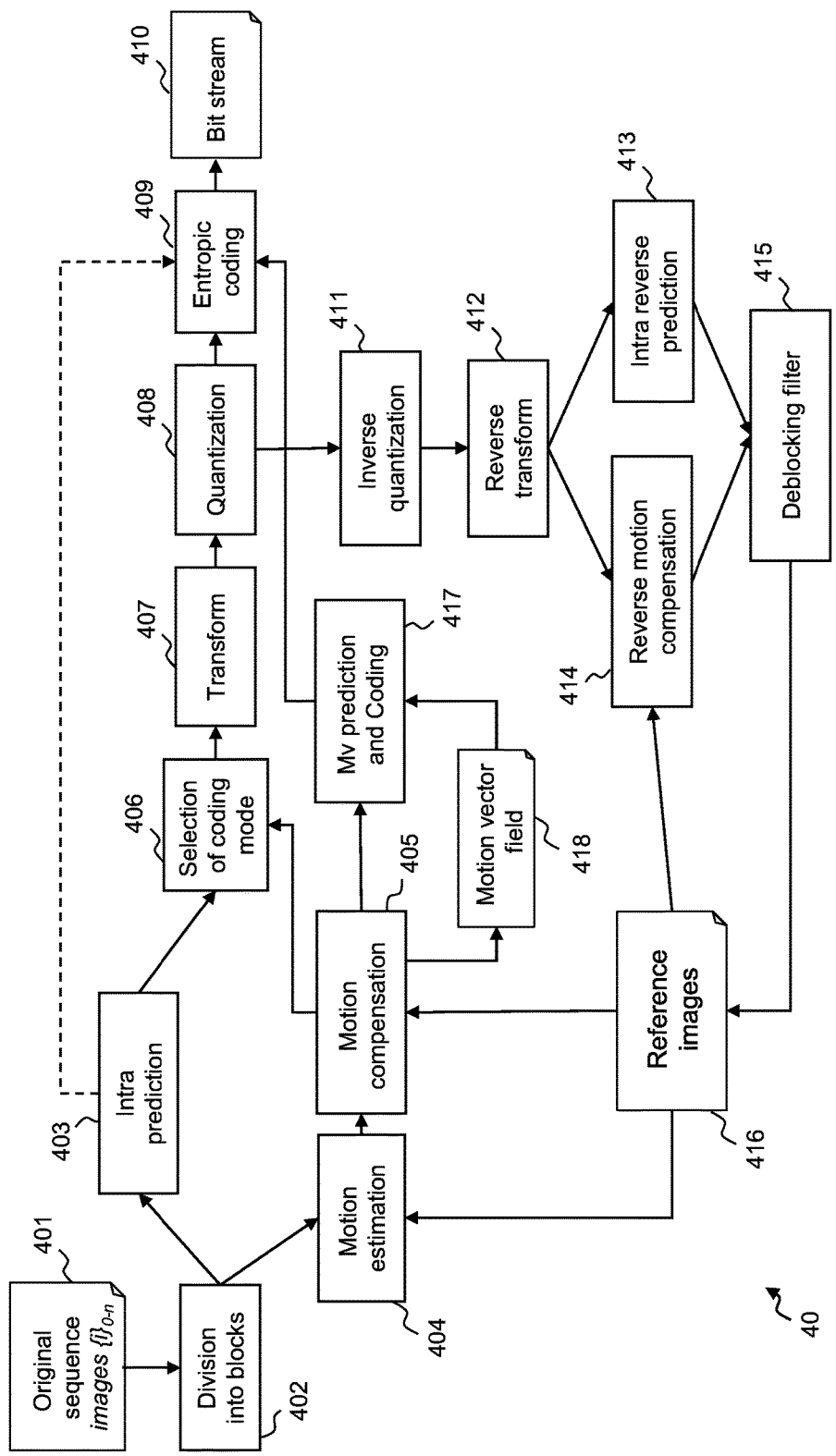
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 301 is received as an input by the encoder 30. Each digital image is represented by a set of samples, known as pixels.

A bitstream 310 is output by the encoder 30 after implementation of the encoding process.

The bitstream 310 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32 pixels). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements Intra prediction, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated by a motion vector.

Thus in both cases (spatial and temporal prediction), a residual is computed by subtracting the prediction from the original block.

In the INTRA prediction implemented by module 403, a prediction direction is encoded. In the temporal prediction, at least one motion vector is encoded.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 418 by a motion vector prediction and coding module 417.

The encoder 40 further comprises a selection module 406 for selection of the coding mode by applying an encoding cost criterion, such as a rate-distortion criterion. The selection of a coding mode and motion vector prediction will be explained in more detail hereafter with reference to any one of FIGS. 6 to 8.

In order to further reduce redundancies a transform is applied by transform module 407 to the residual block, the transformed data obtained is then quantized by quantization module 408 and entropy encoded by entropy encoding module 409. Finally, the encoded residual block of the current block being encoded is inserted into the bitstream 410, along with the information relative to the predictor used such as the index of the selected motion vector predictor. For the blocks encoded in 'SKIP' mode, only an index to the predictor is encoded in the bitstream, without any residual block.

The encoder 40 also performs decoding of the encoded image in order to produce a reference image for the motion estimation of the subsequent images. This enables the encoder and the decoder receiving the bitstream to have the same reference frames. The inverse quantization module 411 performs inverse quantization of the quantized data, followed by an inverse transform by reverse transform module 412. The reverse intra prediction module 413 uses the prediction information to determine which predictor to use for a given block and the reverse motion compensation module 414 actually adds the residual obtained by module 412 to the reference area obtained from the set of reference images 416. Optionally, a deblocking filter 415 is applied to remove the blocking effects and enhance the visual quality of the decoded image. The same deblocking filter is applied at the decoder, so that, if there is no transmission loss, the encoder and the decoder apply the same processing.

Figure 5:
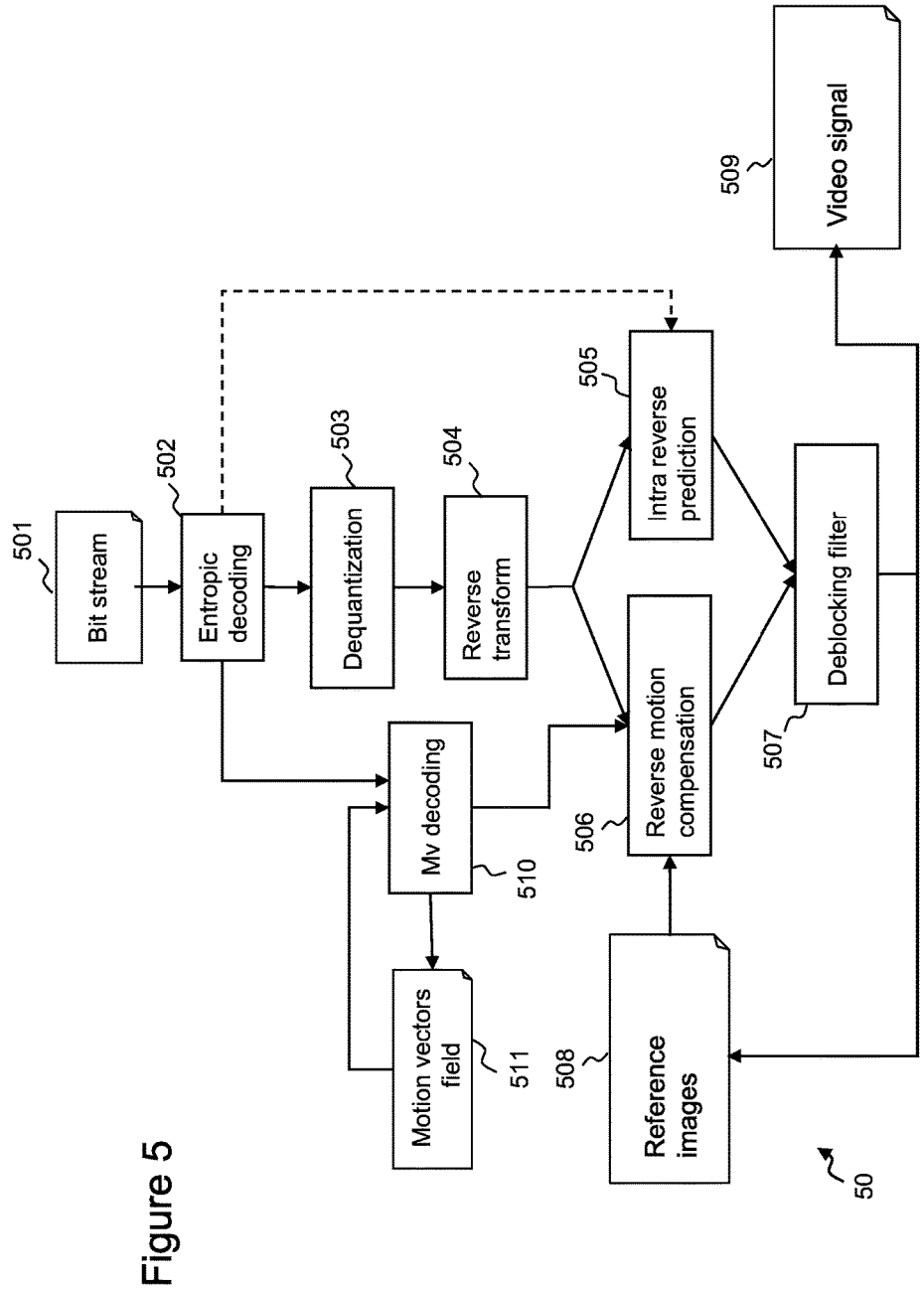
FIG. 5 is a flow chart illustrating steps of a decoding method.

FIG. 5 illustrates a block diagram of a decoder 50 which may be used to receive data from an encoder according to at least one embodiment of the invention. The decoder is represented by connected modules, each module being adapted to implement, for example in the form of programming instructions to be executed by the CPU 311 of device 300, a corresponding step of a decoding method.

The decoder 50 receives a bitstream 501 comprising encoding units, each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 502. The residual data are then dequantized by module 503 and then a reverse transform is applied by module 504 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 505 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 510.

Motion vector decoding module 510 applies motion vector decoding for each current block encoded by motion prediction. Once an index of the motion vector predictor, for the current block has been obtained the actual value of the motion vector associated with the current block can be decoded and used to apply reverse motion compensation by module 506. The reference image portion indicated by the decoded motion vector is extracted from a reference image 508 to apply the reverse motion compensation 506. The motion vector field data 511 is updated with the decoded motion vector in order to be used for the inverse prediction of subsequent decoded motion vectors.

Finally, a decoded block is obtained. A deblocking filter 507 is applied; similarly to the deblocking filter 415 applied at the encoder. A decoded video signal 509 is finally provided by the decoder 50.

Figure 6:
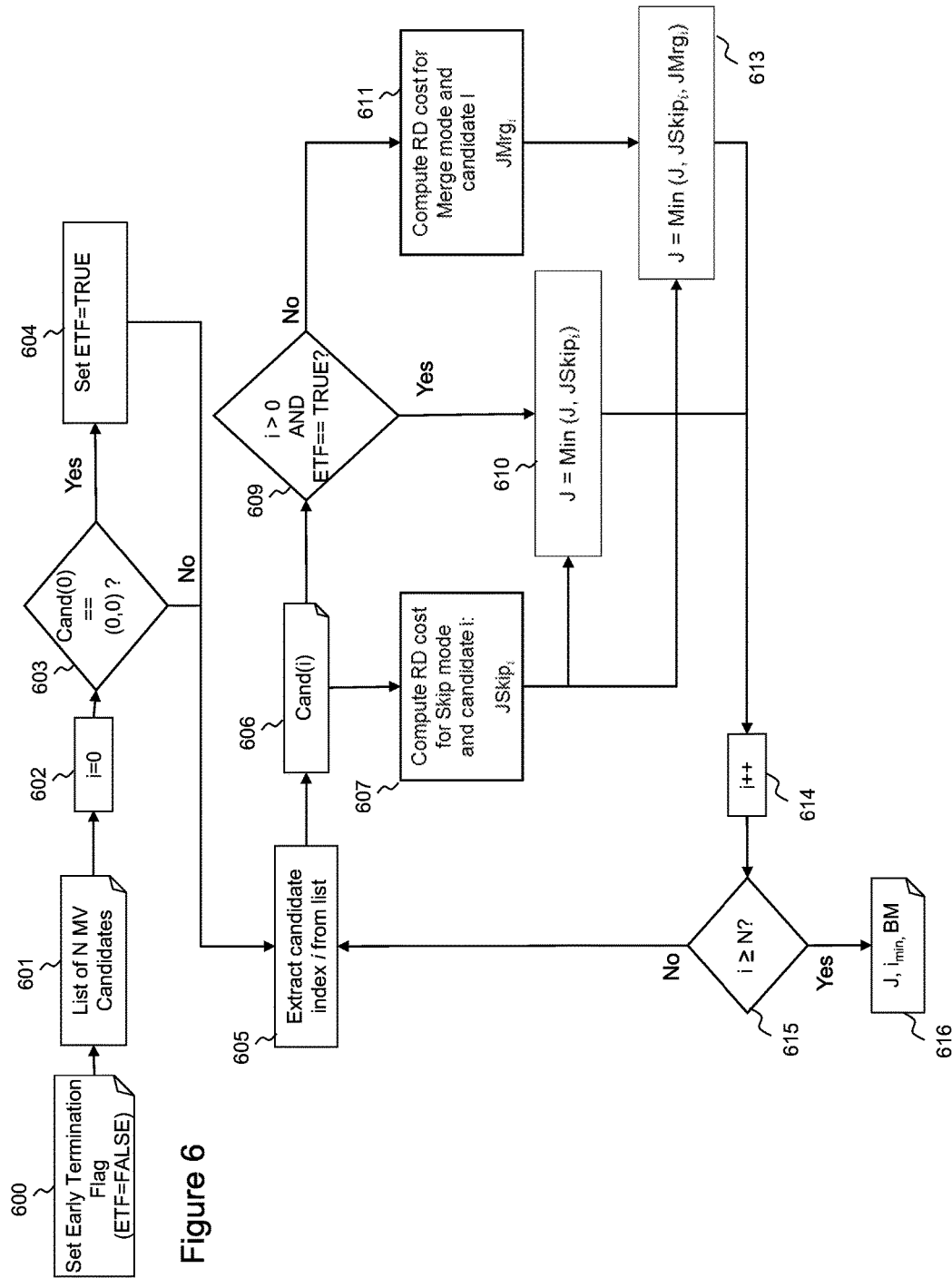
FIG. 6 is a flow chart illustrating steps of a method for selecting encoding parameters according to a first embodiment of the invention.

FIG. 6 is a flow chart illustrating steps of a method according to a first embodiment of the invention for selection of encoding parameters for a block of an image of a video sequence. In this embodiment, a coding mode is selected from among a Merge coding mode and a Skip coding mode; and a motion vector predictor is selected from among a list of candidate motion vector predictors according to determined rate distortion costs. In general, according to the first embodiment, the rate distortion cost is calculated in the Merge mode only for first motion predictor vector candidate in the list of motion predictor vector candidates if the first motion predictor candidate is equal to a zero vector (0,0). If this condition is met, no further rate distortion costs are calculated for the remaining motion predictor candidates in the list for the Merge mode. If the condition is not met, then rate distortion costs for the remaining motion predictor candidates in the list are calculated for the Merge mode for selection of encoding parameters.

Figure 1:
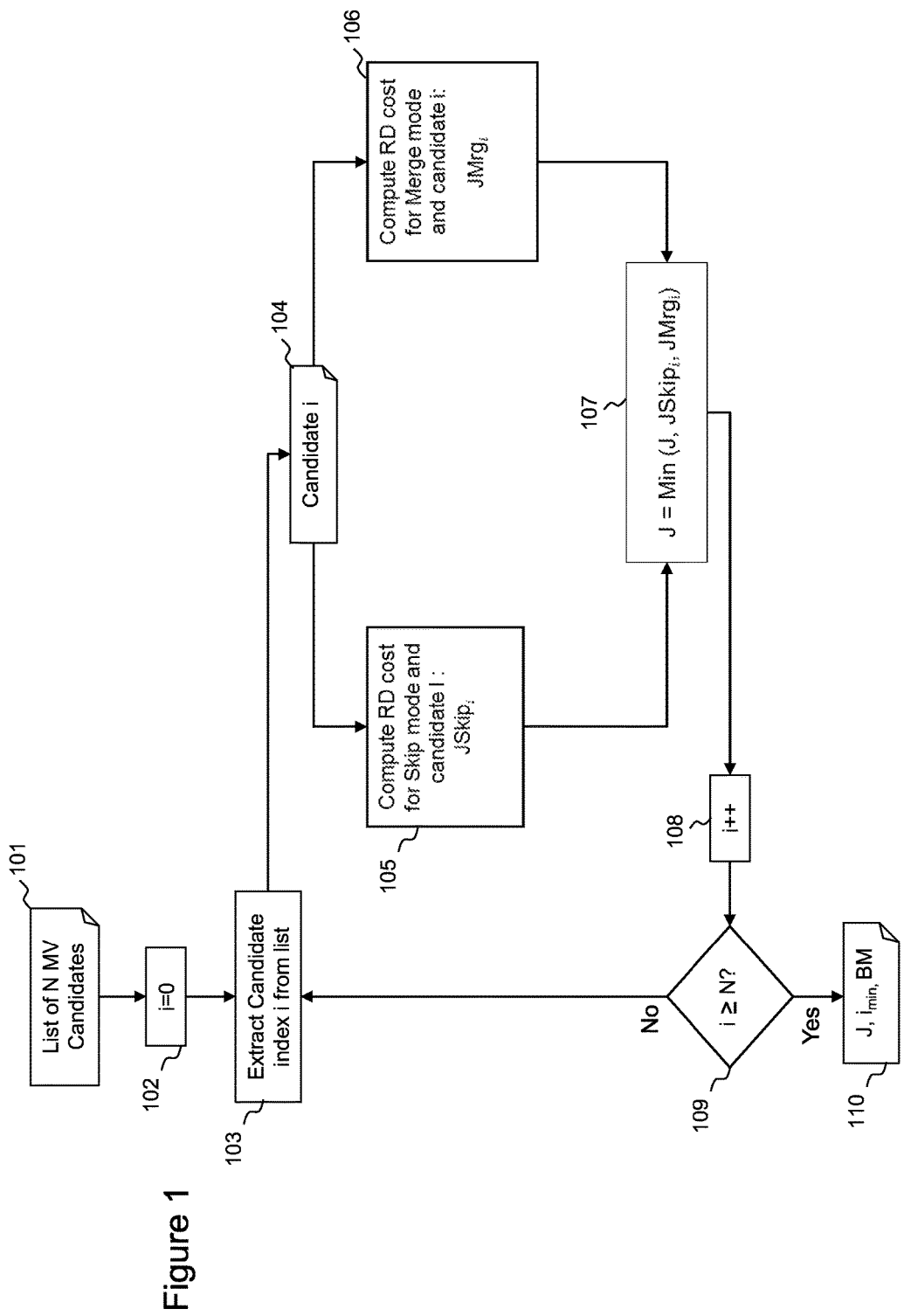
FIG. 1 is a flow chart illustrating steps of a selection process of the prior art for selecting encoding parameters
Figure 2:
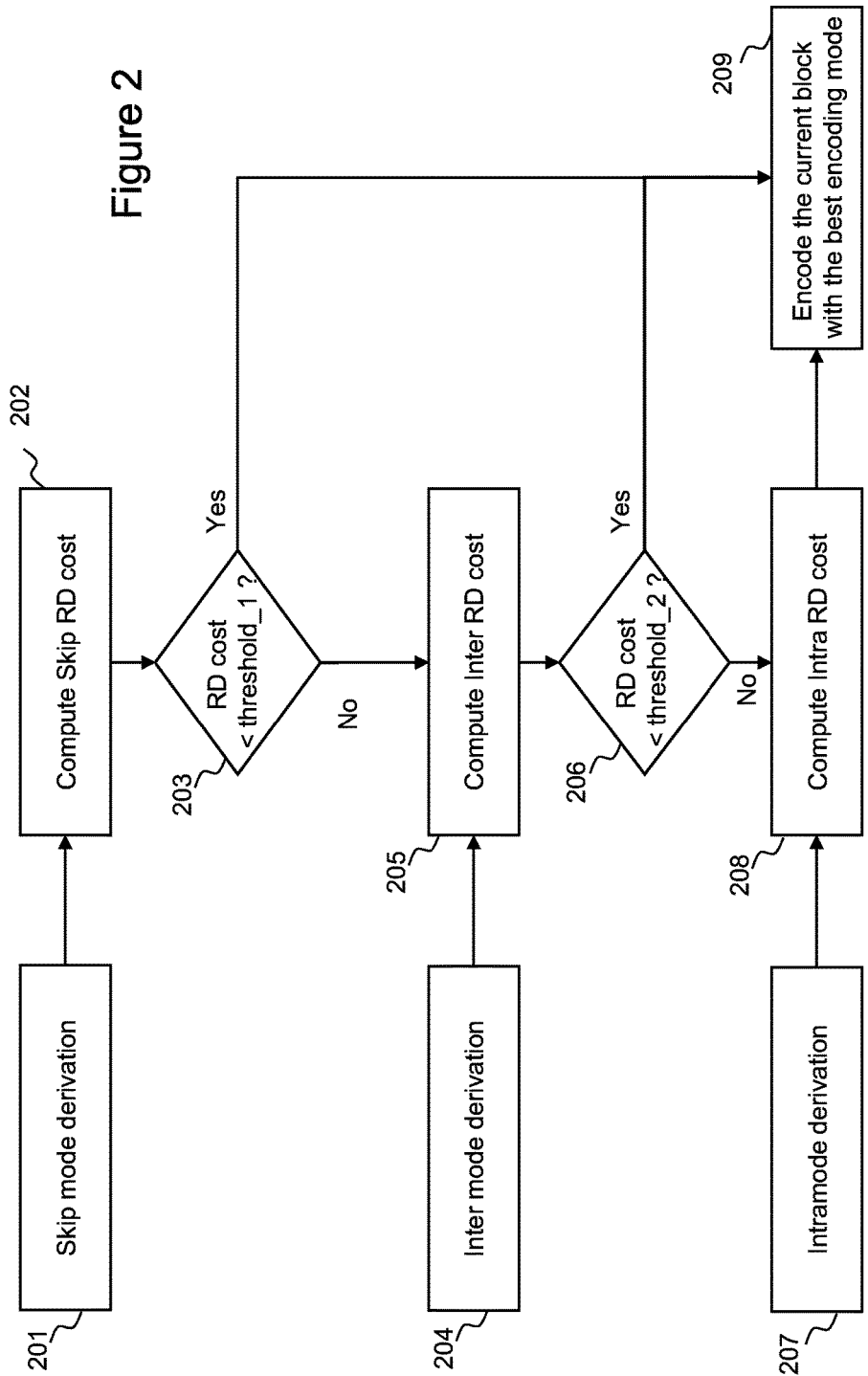
FIG. 2 is a flow chart illustrating steps of a process of the prior art selecting a coding mode.

From statistical analysis performed by the inventors, it has been shown that the first motion vector predictor in a list of motion vector predictor candidates is very important and represents about 60% of the selection when using the selection process of FIG. 1. Moreover when the first motion vector predictor candidate is equal to a zero vector (0,0), this is indicative of a region of the image with no motion. Consequently, considering other motion vector predictor candidates of the set is unlikely to be efficient.

An example of the application of such a termination rule for avoiding unnecessary calculation of rate distortion costs for the Merge mode of encoding will now be described with reference to FIG. 6.

In step 600, the process of selecting encoding parameters is initialized by setting an Early Termination Flag (ETF) variable to FALSE. In step 601 a list of N motion vector predictor candidates is provided and the first candidate in the list with an index of 0 (i=0) is considered in step 602.

In the next step 603, a check is performed to evaluate if the first motion vector predictor candidate in the list is equal to a zero vector signifying that all components are equal to 0. If it is determined that the first motion vector predictor candidate in the list is equal to zero, the variable ETF is set to TRUE in step 604. This signifies that a condition for an early termination of computation of rate distortion costs for the merge mode has been met.

Otherwise if it is determined in step 603 that the first motion vector predictor candidate in the list is not equal to a zero vector the process proceeds directly to step 605 where the motion vector predictor candidate 606 of index i is extracted from the list of candidates. In subsequent step 607 the rate-distortion cost for motion vector predictor candidate i for the Skip mode is calculated.

The rate-distortion cost $JSkip_i$ for motion vector predictor candidate i in the Skip mode for encoding the current block may be determined using a Lagrangian expression:

$$JSkip(i)=DSkip(i)+\lambda RSkip(i)$$

where D corresponds to the distortion introduced on the coding unit, R denotes the rate associated with this coding unit and $\lambda$ denotes the Lagrangian parameter which is fixed to a given value.

In step 609, a check is performed to verify if the motion vector predictor candidate being assessed is not the first motion vector predictor candidate in the list, and if the ETF variable has been set to true in order to determine whether or not a rate distortion cost needs to be computed for motion vector predictor candidate i for the Merge mode:

(i>0) AND (ETF==TRUE)

If it is determined in step 609 that ETF has been set to true and that the candidate is not the first candidate of the list, no rate distortion cost calculation in the merge mode is performed for motion vector predictor candidate indexed by i.

In another example in step 609, it may be checked that the index of the motion vector predictor candidate is greater than a predetermined index I (i>I) where I would correspond to a predefined value enabling the encoding time to be controlled.

Otherwise if is determined in step 609 that a rate distortion cost is to be computed for candidate i, the rate-distortion cost for the Merge mode is computed in step 611 for motion vector predictor candidate indexed in the list by according to an equivalent expression to that for the Skip mode:

$$JMrg(i)=DMrg(i)+\lambda RMrg(i)$$

The rate distortion cost computed for the Merge mode and the rate distortion cost is then computed for the Skip mode for that particular motion vector predictor candidate i are then compared in step 613.

Next, in step 614, a counter related to the index i of the motion vector predictor candidate is incremented. In step 615, a check is performed in order to determine if the entire list of n motion vector predictor candidates has been processed has been processed. If it is determined that the entire list of motion vector predictor candidates has not yet been processed i.e. i<N−1, the next candidate in the motion vector predictor list is processed by returning to step 605 of the process otherwise the selection process for selecting a MV predictor and a coding is completed in step 616.

In step 616, the best mode from among the Skip mode and the Merge mode and the best predictor is identified. The best mode and the best candidate motion vector predictor corresponds to the motion vector predictor candidate, from all of the candidates for which a rate distortion cost was calculated for a Skip mode and/or a Merge mode, which gave the minimum rate distortion cost.

Compared to the selection processes of the prior art for a HEVC encoder in FIG. 1, the number of rate distortion cost operations for the Merge mode is significantly reduced.

Numerical experiments performed in an encoding HEVC test model show a reduction of about 5% of the encoding time without any impact on the coding efficiency.

Figure 7:
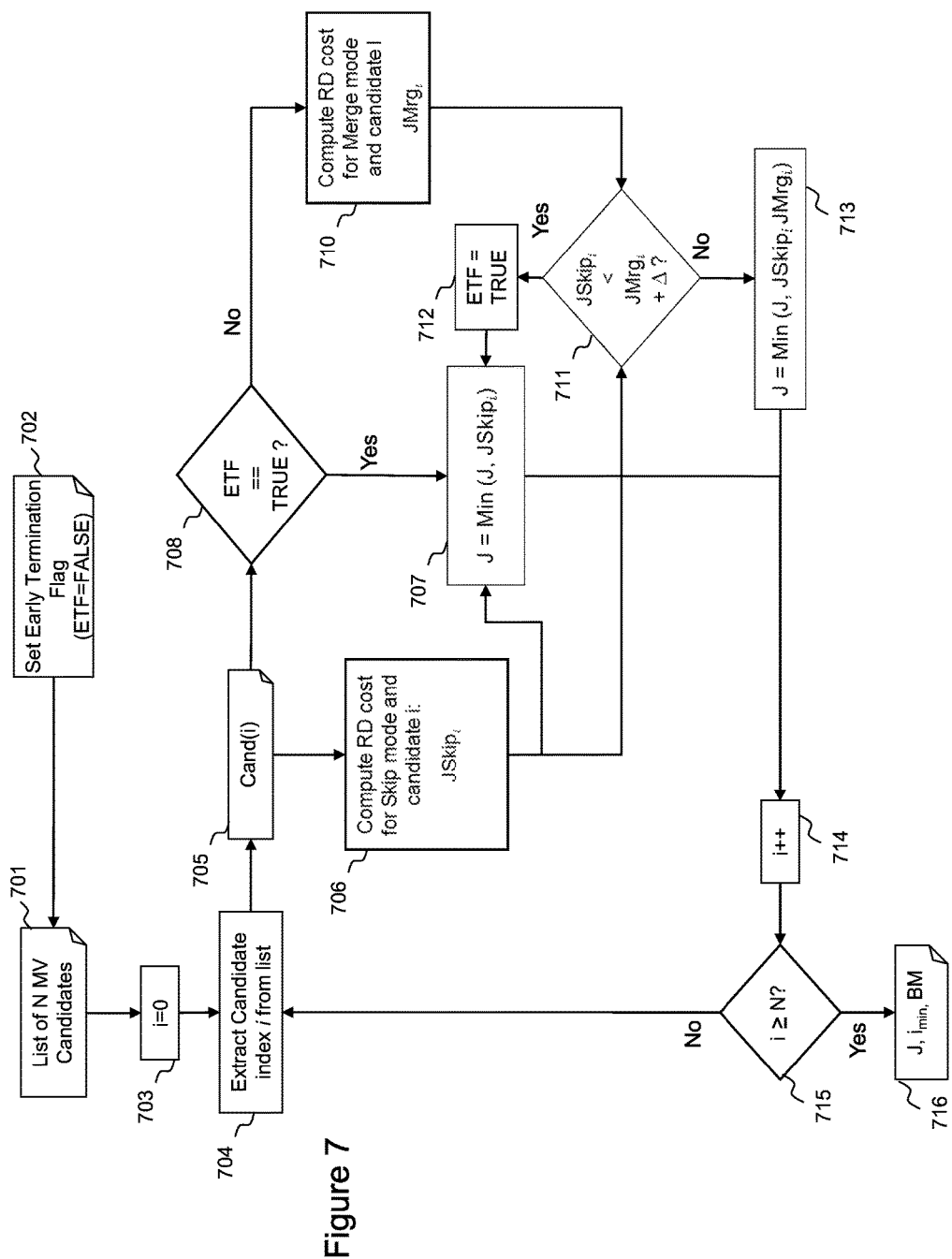
FIG. 7 is a flow chart illustrating steps of a method for selecting encoding parameters according to a second embodiment of the invention.

FIG. 7 is a flow chart illustrating steps of a method according to a second embodiment of the invention for selection of encoding parameters for a block of an image of a video sequence. In this embodiment a coding mode is selected from among a Merge coding mode and a Skip coding mode; and a motion vector predictor is selected from among a list of N candidate motion vector predictors according to determined rate distortion costs. In general, according to the second embodiment, the rate distortion cost is calculated in the Merge mode for motion vector predictor candidates until a predetermined criterion is met by one of the motion vector predictor candidates of the list. In this particular embodiment, a rate distortion cost is calculated in the Merge mode for motion vector predictor candidates until it is found that the rate-distortion cost of a given candidate for the Merge mode, plus a given value represented by $\Delta$, is higher than the corresponding RD cost for the Skip mode of that given candidate, where Δ can represent a certain percentage of $JMrg_i$ or $JSkip_i$. In another example, Δ may be equal to 0. If this condition is met by a motion vector predictor candidate, no further rate distortion costs are calculated for the remaining motion predictor candidates in the list for the Merge mode. If the condition is not met, then rate distortion costs for the remaining motion vector predictor candidates in the list are calculated for the Merge mode for selection of encoding parameters until the condition is met or until all the motion predictor candidates of the list have been evaluated.

As for the previous embodiment, the first predictor is very important and represents about 60% of the selection when using the selection process of FIG. 1. If the Merge mode is efficient on a given predictor, it may be considered that it will probably not be efficient on subsequent motion vector predictor candidates of the list.

In an initial step 701 a list of candidate motion vector predictors is determined. These motion vector predictors correspond to motion vectors of already coded blocks are suitable motion vectors predictors for motion compensation in a Skip coding mode and a Merge coding mode.

The process of selection is initialized in step 702 by setting an Early Termination Flag ETF to false.

In step 703, the candidate index i is set to i=0 in order to index the $i^{th}$ first candidate in the list. The candidate with index i 705 is then extracted in step 704. The rate distortion cost for the Skip mode associated with the candidate is computed in step 706 according to the Lagrangian expression:

$$JSkip(i)=DSkip(i)+\lambda RSkip(i)$$

where D corresponds to the distortion introduced on the coding unit, R denotes the rate associated with this coding unit and λ denotes the Lagrangian parameter which is fixed to a given value. The distortion DSkip(i) is determined by computing the mean square error between this Coding Unit and the corresponding block in the original image.

In step 708, it is determined as to whether or not the rate distortion cost for the motion vector predictor candidate indexed by i needs to be computed for the merge mode by determining if the predetermined condition has already been met by a motion vector predictor candidate of the list. In this example, this is done by verifying of the ETF flag has been set to true. If the ETF flag has not been set to true then it is determined that the predetermined condition has not yet been met and a RD cost for the Merge mode for the predictor candidate indexed by i is evaluated in step 710 according to an equivalent expression:

$$JMrg(i)=DMrg(i)+\lambda RMrg(i)$$

This step is followed by step 711 where a comparison is done between the rate distortion cost of the Skip mode and the rate-distortion cost of the Merge mode for the candidate in the list indexed by i. If it is determined in step 711 that the rate distortion cost in the Skip mode is inferior to the rate distortion cost in the Merge mode for candidate indexed by i, i.e. $JSkip_i<JMrg_i+\Delta$ where Δ is a positive value than can be proportional to $JSkip_i$ or $JMrg_i$ or equal to 0. Then in step 712, the ETF flag is set to true to indicate that the predetermined termination condition has been met. As a consequence no rate-distortion cost in the Merge mode will be computed for the remaining motion vector predictor candidates in the list. Step 712 is then followed by step 707 where the cost $JSkip_i$ of the Skip mode for motion vector predictor candidate indexed by i is compared to the minimum value J found so far for previous motion vector predictor candidates in the list. If $JSkip_i$ is the minimum value, the new minimum value J is set to $JSkip_i$.

Otherwise if in step 711 it is determined that the rate distortion cost for in the skip mode is greater than the rate distortion cost in the Merge mode for the motion vector predictor candidate indexed by i then the process proceeds to step 713. In step 713, the minimum value from between the minimum rate distortion cost so far calculated for motion vector predictor candidates of the list J, the rate distortion cost $JSkip_i$ for motion vector predictor candidate indexed by i in the Skip mode, and the rate distortion cost $JMrg_i$ for motion vector predictor candidate indexed by i in the Merge mode is kept in memory.

In step 714 a counter related to the index i of the predictor candidate is incremented.

A check is then performed in step 715 in order to determine if all the motion vector predictor candidates of the list of N motion vector predictor candidates have been processed.

If it is determined that all N motion vector predictor candidates have not yet been processed, the process returns to step 704 to extract the next motion vector predictor candidate in the list of MV predictor candidates for processing.

If otherwise it is determined in step 715 that all of the N motion vector predictor candidates have been processed, the process proceeds to step 716 which corresponds to the output of the selection algorithm. As an output of the selection process, the best motion vector predictor candidate $i_{min}$ is identified. The best motion vector predictor candidate corresponds to the predictor candidate, from among all N predictor candidates for which a rate distortion cost was determined, which gave the minimum cost J and out of the two modes—Skip mode and Merge mode. The outcome also provides the best mode BM from among the Skip mode and the Merge mode for the $i_{min}$ candidate.

Compared to the prior art methods for an HEVC encoder, the number of rate distortion cost operations for the Merge mode is significantly reduced. Numerical experiment performed in the encoder of HEVC test model shows a reduction about 5% of the encoding time without impacting the coding efficiency.

Figure 8:
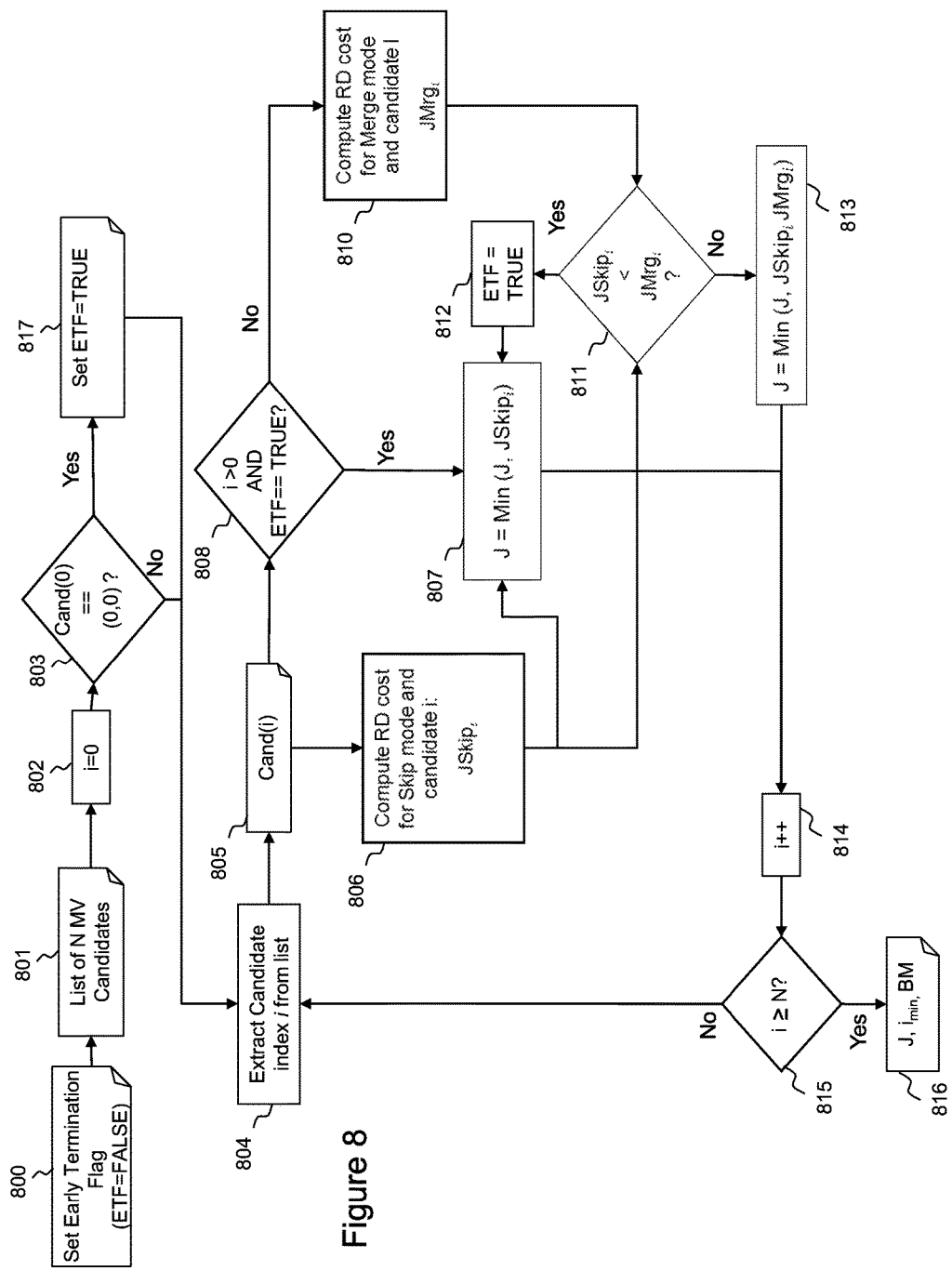
FIG. 8 is a flow chart illustrating steps of a method for selecting encoding parameters according to a third embodiment of the invention.

FIG. 8 is a flow chart illustrating steps of a method according to a third embodiment of the invention for selection of encoding parameters for a block of an image of a video sequence. In this embodiment a coding mode is selected from among a Merge Intra coding mode and a Skip Intra coding mode; and a motion vector predictor is selected from among a list of N candidate motion vector predictors according to determined rate distortion costs. In general, according to the third embodiment, the rate distortion cost is calculated in the Merge mode for motion vector predictor candidates until one of two predetermined conditions is met by one of the motion vector predictor candidates of the list. The first condition corresponds to that of the first embodiment i.e. the rate distortion cost is calculated in the Merge mode only for first motion predictor vector candidate in the list of motion predictor vector candidates if the first motion predictor candidate is equal to a zero vector (0,0). The second condition corresponds to that of the second embodiment i.e. the rate-distortion cost of a given candidate for the Merge mode is higher that the corresponding RD cost for the Skip mode of that given candidate. If either of the predetermined conditions is met, no further rate distortion costs are calculated for the remaining motion predictor candidates in the list for the Merge mode. If the condition is not met, then rate distortion costs for the remaining motion predictor candidates in the list are calculated for the Merge mode for selection of encoding parameters.

In step 800, the process of selecting encoding parameters according to the third embodiment of the invention is initialized by setting an Early Termination Flag (ETF) variable to FALSE. In step 80,1 a list of N motion vector predictor candidates is provided suitable for encoding by motion compensation in a Merge coding mode and a Skip coding mode and the first candidate in the list with an index of 0 (i=0) is considered in step 802.

In the next step 803, a check is performed to evaluate if the first motion vector predictor candidate in the list is equal to a zero vector signifying that all components are equal to 0. If it is determined that the first motion vector predictor candidate in the list is equal to zero the variable ETF is set to TRUE in step 817. This signifies that a condition for an early termination of computation of rate distortion costs for the Merge mode has been met.

Otherwise, if it is determined in step 803 that the first motion vector predictor candidate in the list is not equal to a zero vector the process proceeds directly to step 804 where the motion vector predictor candidate 805 of index i is extracted from the list of motion vector predictor candidates. In subsequent step 806, the rate-distortion cost for motion vector predictor candidate i for the Skip mode is calculated.

The rate-distortion cost $JSkip_i$ of motion vector predictor candidate i for encoding the current block in the Skip mode may be determined using the Lagrangian expression:

$$JSkip(i)=DSkip(i)+\lambda RSkip(i)$$

where D corresponds to the distortion introduced on the block, R denotes the rate associated with this coding unit and λ denotes the Lagrangian parameter which is fixed to a given value.

In step 808, a check is performed to verify if the motion vector predictor candidate being assessed is not the first motion vector predictor candidate in the list, and if the ETF variable has been set to true, in order to determine whether or not a rate distortion cost needs to be computed for motion vector predictor candidate i for the Merge mode:

$$(i>0) \text{ AND } (ETF==TRUE$$

If it is determined in step 808 that ETF has been set to true and that the candidate is not the first candidate of the list, no rate distortion cost calculation in the Merge mode is performed for motion vector predictor candidate indexed by i.

In another example in step 808, it may be checked that the index of the motion vector predictor candidate is greater than a predetermined index i (i>I) where I would correspond to a predefined value enabling the encoding time to be controlled.

Otherwise, if it is determined in step 808 that a rate distortion cost is to be computed for candidate i in the Merge mode, the rate-distortion cost for the Merge mode is computed in step 810 for motion vector predictor candidate indexed in the list by i according to an equivalent expression to that for the Skip mode:

$$JMrg(i)=DMrg(i)+\lambda RMrg(i)$$

This step is followed by step 811 where a comparison is done between the rate distortion cost of the Skip mode and the rate-distortion cost of the Merge mode for the candidate in the list indexed by i. If it is determined in step 811 that the rate distortion cost in the Skip mode is inferior to the rate distortion cost in the Merge mode for candidate indexed by i, i.e. $JSkip_i<JMrg_i$, then in step 812 the ETF flag is set to true to indicate that the alternative predetermined termination condition has been met. As a consequence no rate-distortion cost in the Merge mode will be computed for the remaining motion vector predictor candidates in the list. In an alternative embodiment, $JSkip_i$ is compared to $JMrg_i+\Delta$ in step 811, similarly to step 711 of FIG. 7, where Δ is a positive value than can be proportional to $JSkip_i$ or $JMrg_i$ or equal to 0.

Step 812 is then followed by step 807 where the cost $JSkip_i$ of the Skip mode for motion vector predictor candidate indexed by i is compared to the minimum value J found so far for previous motion vector predictor candidates in the list. If $JSkip_i$ is the minimum value, the new minimum value J is set to $JSkip_i$.

Otherwise, if in step 811 it is determined that the rate distortion cost for in the skip mode is greater than the rate distortion cost in the Merge mode for the motion vector predictor candidate indexed by i then the process proceeds to step 813. In step 813, the minimum value from between the minimum rate distortion cost so far calculated for motion vector predictor candidates of the list J, the rate distortion cost $JSkip_i$ for motion vector predictor candidate indexed by i in the Skip mode, and the rate distortion cost $JMrg_i$ for motion vector predictor candidate indexed by i in the Merge mode is kept in memory.

In step 814, a counter related to the index i the predictor candidate is incremented.

A check is then performed in step 815 in order to determine if all the motion vector predictor candidates of the list of N MV predictor candidates have been processed.

If it is determined that all N MV predictor candidates have not yet been processed, the process returns to step 804 to extract the next MV predictor candidate in the list of MV predictor candidates for processing.

If otherwise it is determined in step 815 that all of the N MV predictor candidates have been processed, the process proceeds to step 816 which corresponds to the output of the selection algorithm. As an output of the selection process, the best motion vector predictor candidate $i_{min}$ is identified.

The best motion vector predictor candidate corresponds to the motion vector predictor candidate, from among all N predictor candidates for which a rate distortion cost was determined, which gave the minimum cost J and out of the two modes—Skip mode and Merge mode. The outcome also provides the best mode BM from among the Skip mode and the Merge mode for the $i_{min}$ candidate.

Figure 9:
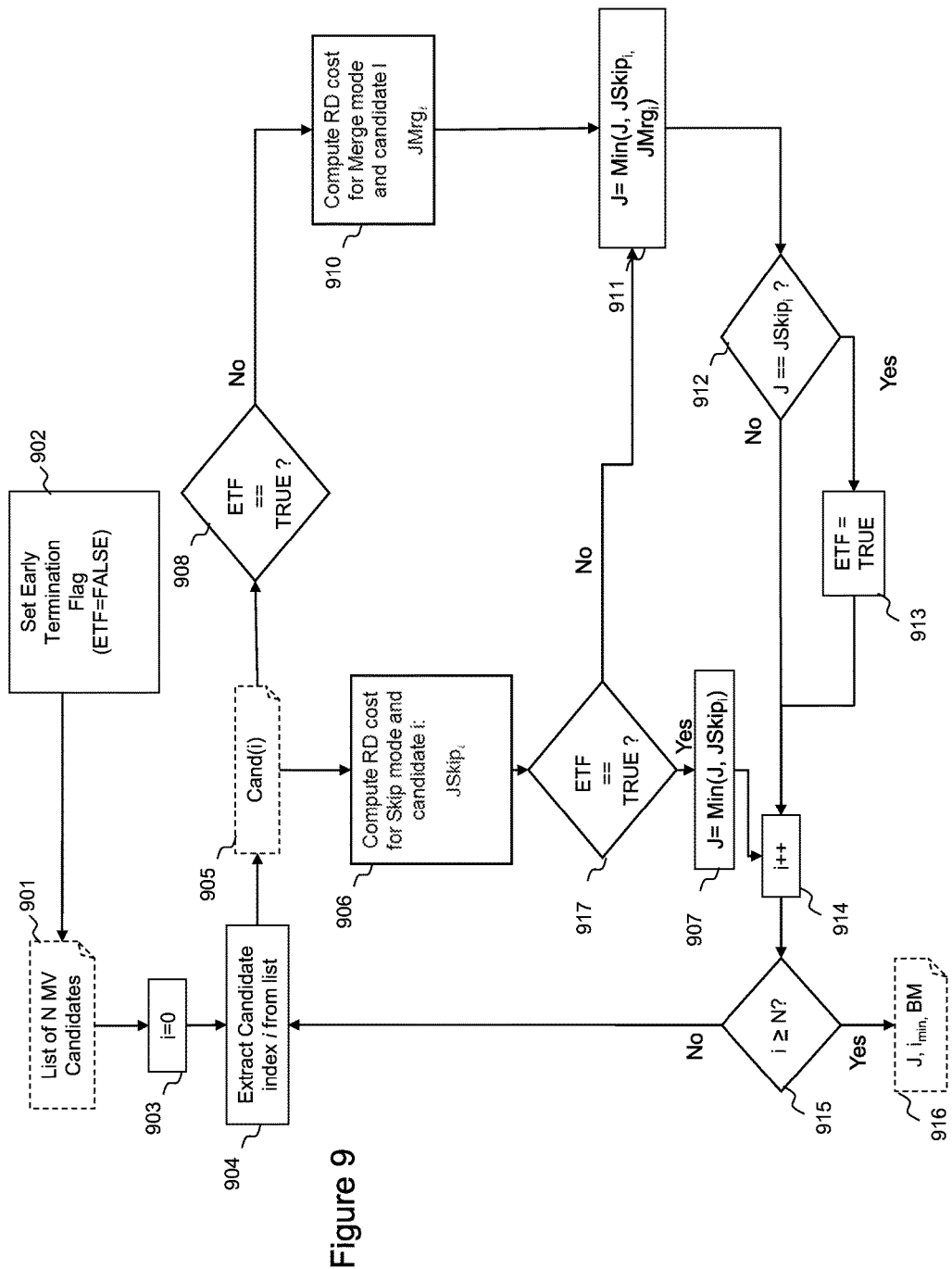
FIG. 9 is a flow chart illustrating steps of a method for selecting encoding parameters according to a fourth embodiment of the invention.
Figure 10:
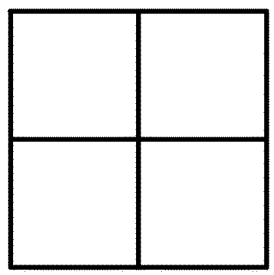
FIG. 10 illustrates examples of block partitioning which may be used in the context of embodiments of the invention.
Figure 10:
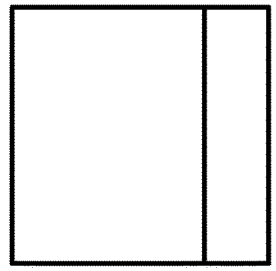
Figure 10:
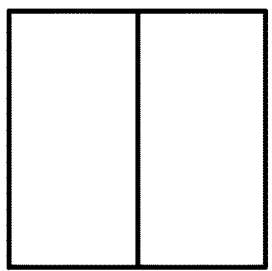
Figure 10:
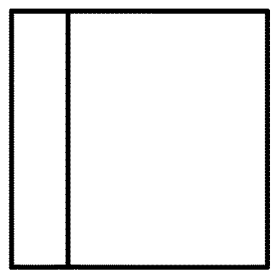
Figure 10:
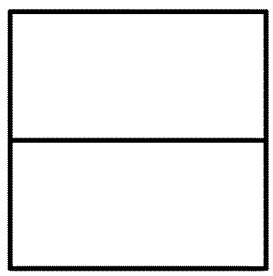
Figure 10:
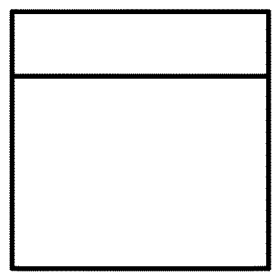
Figure 10:
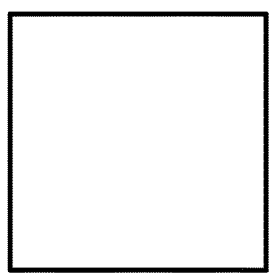
Figure 10:
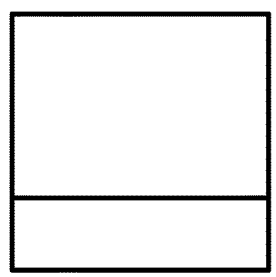

FIG. 9 is a flow chart illustrating steps of a method according to a fourth embodiment of the invention for selection of encoding parameters for a block of an image of a video sequence. In this embodiment a coding mode is selected from among a Merge coding mode and a Skip coding mode, and a motion vector predictor is selected from among a list of N candidate motion vector predictors according to determined rate distortion costs. In general, according to the second embodiment, the rate distortion cost is calculated in the Merge mode for motion vector predictor candidates until a predetermined criterion is met by one of the motion vector predictor candidates of the list. In this particular embodiment, a rate distortion cost is calculated in the Merge mode for motion vector predictor candidates until it is found that the rate-distortion cost of a given candidate for the Skip mode is lower than the minimum rate-distortion cost (among Skip or Merge modes) of previous candidates already processed. If this condition is met by a motion vector predictor candidate, no further rate distortion costs are calculated for the remaining motion predictor candidates in the list for the Merge mode. If the condition is not met, then rate distortion costs for the remaining motion vector predictor candidates in the list are calculated for the Merge mode for selection of encoding parameters until the condition is met or until all the motion predictor candidates of the list have been evaluated.

In an initial step a list of candidate motion vector predictors 901 is determined. These motion vector predictors correspond to motion vectors of already coded blocks that are suitable motion vectors predictors for motion compensation in a Skip coding mode and a Merge coding mode.

The process of selection is initialized in step 902 by setting an Early Termination Flag ETF to false.

In step 903, the index i of candidates is set to i=0 in order to index the first candidate in the list. The candidate with index i (represented by reference 905) is then extracted in step 904. The rate distortion cost for the Skip mode associated with the $i^{th}$ candidate is computed in step 906 according to the Lagrangian expression:

$$JSkip(i)=DSkip(i)+\lambda RSkip(i)$$

where D corresponds to the distortion introduced on the coding unit, R denotes the rate associated with this coding unit and λ denotes the Lagrangian parameter which is fixed to a given value. The distortion DSkip(i) is determined by computing the mean square error between this Coding Unit and the corresponding block in the original image.

Step 906 is then followed by step 917. In step 917, it is determined as to whether or not the rate distortion cost $JSkip_i$ for motion vector predictor candidate indexed by i in the Skip mode, has to be compared to the rate distortion cost $JMrg_i$ for motion vector predictor candidate indexed by i in the Merge mode in addition to the minimum rate distortion cost so far calculated for motion vector predictor candidates of the list J, by determining if the predetermined condition has already been met by a motion vector predictor candidate of the list. In this example, this is done by verifying if the ETF flag has been set to true. If ETF has been set to true then step 917 is followed by step 907 where the cost $JSkip_i$ of the Skip mode for motion vector predictor candidate indexed by i is compared to the minimum value J found so far for previous motion vector predictor candidates in the list. If $JSkip_i$ is the minimum value, the new minimum value J is set to $JSkip_i$.

If ETF has not been set to true, then step 917 is followed by step 911, described below.

In step 908, it is determined as to whether or not the rate distortion cost for the motion vector predictor candidate indexed by i needs to be computed for the merge mode by determining if the predetermined condition has already been met by a motion vector predictor candidate of the list. If the ETF flag has not been set to true then it is determined that the predetermined condition has not yet been met and a RD cost for the Merge mode for the predictor candidate indexed by i is evaluated in step 910 according to an equivalent expression:

$$JMrg(i)=DSkip(i)+\lambda RMrg(i)$$

This step 910 is followed by step 911 where the minimum value between the minimum rate distortion cost so far calculated for motion vector predictor candidates of the list J, the rate distortion cost $JSkip_i$ for motion vector predictor candidate indexed by i in the Skip mode, and the rate distortion cost $JMrg_i$ for motion vector predictor candidate indexed by i in the Merge mode is kept in memory.

Step 911 is then followed by step 912 where an equality test is performed between the minimum rate distortion cost J and the rate distortion cost $JSkip_i$ for the motion vector predictor candidate indexed by i in the Skip mode.

If the answer is positive in step 912, this step is followed by step 913 where the ETF flag is set to true to indicate that the predetermined termination condition has been met. As a consequence, no rate-distortion cost in the Merge mode will be computed for the remaining motion vector predictor candidates in the list (cf. step 917 and 908).

If the answer is negative in step 912, the process proceeds with step 914 where a counter related to the index i of the predictor candidate is incremented.

A check is then performed in step 915 in order to determine if all the motion vector predictor candidates of the list of N motion vector predictor candidates have been processed.

If it is determined that all N motion vector predictor candidates have not yet been processed, the process returns to step 904 to extract the next motion vector predictor candidate in the list of MV predictor candidates for processing.

If otherwise it is determined in step 915 that all of the N motion vector predictor candidates have been processed, the process proceeds to step 916 which corresponds to the output of the selection algorithm. As an output of the selection process, the best motion vector predictor candidate 6, is identified. The best motion vector predictor candidate corresponds to the predictor candidate, from among all N predictor candidates for which a rate distortion cost was determined, which gave the minimum cost J and out of the two modes—Skip mode and Merge mode. The outcome also provides the best mode BM from among the Skip mode and the Merge mode for the $i_{min}$ candidate.

Compared to the prior art methods for an HEVC encoder, the number of rate distortion cost operations for the Merge mode is significantly reduced. Numerical experiment performed in the encoder of HEVC test model shows a reduction about 5% of the encoding time without impacting the coding efficiency. In addition as the Merge mode is less selected by this process, the decoding time is also reduced and a reduction about 3% of the decoding time has been observed in the HEVC test model.

Embodiments of the invention thus provide ways of reducing the computational complexity for the selection of a motion vector predictor candidate and a coding mode in an HEVC encoder. The complexity is reduced by minimizing the evaluation of the rate-distortion cost in the Merge mode for which the evaluation is more time consuming than that of a Skip mode (or Inter mode). The introduction of an early termination algorithm thus helps to avoid the need to compute the rate-distortion cost for all of the candidate predictors.

Although the present invention has been described hereinabove with reference to specific embodiments, the present invention is not limited to the specific embodiments, and modifications will be apparent to a skilled person in the art which lie within the scope of the present invention. Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of determining encoding parameters for encoding, into a bitstream, a portion of an image of a video sequence, the image portion being encoded by motion estimation with respect to a reference image portion, the encoding parameters for encoding the image portion by motion estimation including a coding mode and a motion information predictor for predicting motion information for obtaining the reference image portion, said method comprising
selecting a coding mode to encode the image portion by motion estimation from a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes;
selecting a motion information predictor to encode the motion information of the image portion from the set of motion information predictors which is the same for the first and the second coding modes,
wherein the selection of the coding mode and the motion information predictor involve comparing costs of encoding the image portion using the motion information predictors of the set in the first and second coding modes, said comparison of costs comprising:
calculating for one of the motion information predictors of the set, the cost of encoding the image portion for the first coding mode and the cost of encoding the image portion for the second coding mode;
detecting when one or more conditions are met, wherein the one or more conditions include a condition that, for the one of the motion information predictors of the set, the first-coding-mode cost of encoding the image portion is less than the second coding mode cost of encoding the image portion
if it is detected that the one or more conditions are met, omitting the computing of a cost for the second-coding-mode for any motion information predictors of the set for which a cost for the second coding mode has not yet been computed, and otherwise computing of the cost for the second coding mode for at least one further motion information predictor of the set for which a cost for the second coding mode has not yet been computed.

2. The method as claimed in claim 1, wherein one condition is that a first motion information predictor in said set is a zero vector.

3. The method as claimed in claim 2, wherein if it is detected that the condition is met, the computing of the second-coding-mode cost is omitted for all motion information predictors except for said first motion information predictor.

4. The method according to claim 1, wherein the condition in which the second-coding-mode cost is greater than the first-coding-mode cost depends on the usage of residual texture data by the second coding mode.

5. The method as claimed in claim 1, wherein one condition is that, for one of the motion information predictors of the set, the second-coding-mode cost exceeds the first-coding-mode cost by more than a predetermined amount.

6. The method as claimed in claim 1, wherein one condition is that, for one of the motion information predictors of the set, the first-coding-mode cost is less than any previously computed first coding-mode cost and less than any previously computed second coding-mode cost.

7. The method as claimed in claim 1, wherein one condition is that, for one of the motion information predictors of the set, the first-coding-mode cost is less, by more than a predetermined amount, than any previously computed first coding-mode cost and less, by more than a predetermined amount, than any previously computed second coding-mode cost.

8. The method as claimed in claim 1, wherein if it is detected that the condition is met, the computing of the second-coding-mode cost is omitted for all motion information predictors following said one motion information predictor meeting said condition.

9. The method as claimed in claim 1, comprising computing the costs for the motion information predictors of said set sequentially starting from a first motion information predictor of the set.

10. The method as claimed in claim 9, comprising:
detecting when at least one condition relating to one or more motion information predictors of the set, or relating to one or more costs already computed, is met;
if it is detected that the condition is met, omitting the computing of the first-coding-mode cost and/or the second-coding-mode cost for at least one said motion information predictor of the set, and otherwise carrying out the computing of the cost concerned;
computing both said first-coding-mode cost and said second-coding-mode cost for a motion information predictor when said condition is not met or, if there is more than one condition, none of the conditions is met; and
computing the first-coding-mode cost but not the second-coding-mode cost for a motion information predictor when it is detected that the or one said condition is met.

11. The method as claimed in claim 1, wherein each said cost is a rate-distortion cost.

12. A method of determining encoding parameters for encoding, into a bitstream, a portion of an image of a video sequence, the image portion being encoded by motion estimation with respect to at least one reference image portion, the encoding parameters for encoding the image portion including a coding mode and a motion information predictor for predicting motion information for obtaining the reference image portion, said method comprising
selecting a coding mode to encode the image portion by motion estimation from at least a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes;
selecting a motion information predictor to encode the motion information of the image portion from the set of motion information predictors, each motion information predictor of the set being adapted for use in encoding of the image portion by motion estimation in at least the first and the second coding modes, the method comprising:
determining a first cost parameter value, representative of a cost of encoding the image portion using the first coding mode, for each of a number of motion information predictors of the set;

determining a second cost parameter value, representative of a cost of encoding the image portion using the second coding mode, for a motion information predictor for which the first cost parameter value is determined;

selecting a coding mode and a motion information predictor corresponding to the minimum cost parameter value from among the determined first and second cost parameter values, wherein the second cost parameter value is determined for another motion information predictor of the set unless a first predetermined condition is met, and wherein the first predetermined condition is that the value of the first cost parameter determined for the motion information predictor is indicative of a cost less than the respective value of the second cost parameter determined for the motion information predictor.

13. The method according to claim 12, wherein the motion information predictors are arranged in the set according to a predetermined order.

14. The method according to claim 12, wherein the second cost parameter value is determined for another motion information predictor of the set unless a second predetermined condition is met.

15. The method according to claim 12, wherein the first cost parameter and the second cost parameter are each representative of a rate distortion cost.

16. The method according to claim 12, wherein in the first coding mode only an index of the motion information predictor is encoded into the bitstream.

17. The method according to claim 16, wherein the first coding mode is a skip-type inter coding mode and the second coding mode is a merge type inter coding mode.

18. The method according to claim 12, wherein in the second coding mode an identifier of the motion information predictor and texture residual information representative of a difference between the image portion and the reference image portion, are encoded into the bitstream.

19. The method according to claim 12, wherein the second cost parameter value is determined unless either the first predetermined condition is met or a further predetermined condition is met by the said motion information predictor, wherein the further predetermined condition is that the said motion information predictor has a predetermined index and is a zero vector.

20. A method of encoding a portion of an image into a bitstream, the method comprising:

determining encoding parameters for encoding the image portion by motion estimation with respect to a reference image portion, into a bitstream the image portion being encoded by motion estimation with respect to a reference image portion, the encoding parameters for encoding the image portion by motion estimation including a coding mode and a motion information predictor for predicting motion information for obtaining the reference image portion, said method comprising selecting a coding mode to encode the image portion by motion estimation from a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes;

selecting a motion information predictor to encode the motion information of the image portion from the set of motion information predictors which is the same for the first and the second coding modes, wherein the selection of the coding mode and the motion information predictor involve comparing costs of encoding the image portion using the motion information predictors of the set in the first and second coding modes;

calculating for one of the motion information predictors of the set, the cost of encoding the image portion for the first coding mode and the cost of encoding the image portion for the second coding mode;

encoding the image portion using the determined encoding parameters; and wherein determining the encoding parameters comprises, detecting when one or more conditions are met, wherein the one or more conditions include a condition that, for the one of the motion information predictors of the set, the first-coding mode cost of encoding the image portion is less than the second coding mode cost of encoding the image portion if it is detected that the one or more conditions are met, omitting the computing of a cost for the second-coding-mode for any motion information predictors of the set for which a cost for the second coding mode has not yet been computed, and otherwise computing of a cost for the second coding mode for at least one further motion information predictor of the set for which a cost for the second coding mode has not yet been computed.

21. A device for determining encoding parameters for encoding, into a bitstream, a portion of an image of a video sequence, the image portion being encoded by motion estimation with respect to at least one reference image portion, the encoding parameters for encoding the image portion including a coding mode and a motion information predictor for predicting motion information for obtaining the reference image portion, the device comprising:

a selection unit configured to select a coding mode to encode the image portion by motion estimation from at least a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes and being configured to select a motion information predictor to encode the motion information of the image portion from the set of motion information predictors which is the same for at least the first and the second coding modes, wherein the selection being based on costs of encoding the image portion using the motion information predictors of the set in the first and second coding modes; and a processing unit configured to calculate for one of the motion information predictors of the set, the cost of encoding the image portion for the first coding mode and the cost of encoding the image portion for the second coding mode said costs of encoding the image portion using the motion information predictors of the set in the first and second coding modes and being configured to detect when one or more conditions are met, wherein the one or more conditions include a condition that, for the one of the motion information predictors of the set, the first coding mode cost of encoding the image portion is less than the second coding mode cost of encoding the image portion if it is detected that the one or more conditions are met, omit the computing of a cost for any motion information predictors of the set for which a cost for the second coding mode has not yet been computed, and otherwise computing of the cost for the second coding mode for at least one further motion information predictor of the set for which a cost for the second coding mode has not yet been computed.

22. A device for determining encoding parameters for encoding, into a bitstream, a portion of an image of a video sequence, the image portion being encoded by motion estimation with respect to at least one reference image portion, the encoding parameters for encoding the image portion including a coding mode and a motion information predictor for predicting motion information for obtaining the reference image portion, the device comprising:

a selection unit configured to select a coding mode to encode the image portion by motion estimation from at least a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes selecting a motion information predictor to encode the motion information of the image portion from the set of motion information predictors, each motion information predictor of the set being adapted for use in encoding of the image portion by motion estimation in at least the first and the second coding modes, the device further comprising a processing unit configured to:

determine a first cost parameter value, representative of a cost of encoding the image portion using the first coding mode, for each of a number of motion information predictors of the set; and being further configured to determine a second cost parameter value, representative of a cost of encoding the image portion using the second coding mode, for a motion information predictor for which the first cost parameter value is determined;

wherein the selection unit is configured to select a coding mode and a motion information predictor corresponding to the minimum cost parameter value from among the determined first and second cost parameter values, wherein the second cost parameter value is determined for another motion information predictor of the set unless a first predetermined condition is met, and wherein the first predetermined condition is that the value of the first cost parameter determined for the motion predictor is indicative of a cost less than the respective value of the second cost parameter determined for the motion information predictor.

23. An encoder for encoding a portion of an image into a bitstream, the encoder comprising:

a device configured to determine encoding parameters for encoding, into a bitstream, a portion of an image of a video sequence, the image portion being encoded by motion estimation with respect to a reference image portion, the encoding parameters for encoding the image portion by motion estimation including a coding mode and a motion information predictor for predicting motion information for obtaining the reference image portion, the device comprising:

a selection unit configured to select a coding mode to encode the image portion by motion estimation from a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes and being configured to select a motion information predictor to encode the motion information of the image portion from the set of motion information predictors which is the same for the first and the second coding modes, wherein the selection being based on costs of encoding the image portion using the motion information predictors of the set in the first and second coding modes; and a processing unit configured to compute said costs of encoding the image portion using the motion information predictors of the set in the first and second coding modes and being configured to detect when one or more conditions are met wherein the one or more conditions include a condition that, for the one of the motion information predictors of the set, the first-coding-mode cost of encoding the image portion is less than the second-coding-mode cost of encoding the image portion if it is detected that the one or more conditions are met, omit the computing of a cost for the second-coding-mode for any motion information predictors of the set for which a cost for the second coding mode has not yet been computed, and otherwise computing of the cost for the second coding mode for at least one further motion information predictor of the set for which a cost for the second coding mode has not yet been computed; and wherein said encoder further comprises an encoding unit configured to encode the image portion using the determined encoding parameters.

24. A non-transitory computer-readable storage medium comprising processor executable code for performing a method of determining encoding parameters for encoding, into a bitstream, a portion of an image of a video sequence, in which at least one image portion is being encoded by motion estimation with respect to a reference image portion, the encoding parameters for encoding the image portion by motion estimation include a coding mode and a motion information predictor for predicting motion information for obtaining the reference image portion, said method comprising selecting a coding mode to encode the image portion by motion estimation from a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes selecting a motion information predictor to encode the motion information of the image portion from the set of motion information predictors which is the same for the first and the second coding modes, wherein the selection of the coding mode and the motion information predictor involve comparing costs of encoding the image portion using the motion information predictors of the set in the first and second coding modes, wherein execution of the processor executable code by one or more processors causes the one or more processors for at least one image portion, to:

calculate for one of the motion information predictors of the set, the cost of encoding the image portion for the first coding mode and the cost of encoding the image portion for the second coding mode;

detect when one or more conditions are met, wherein the one or more conditions include a condition that, for the one of the motion information predictors of the set, the first coding mode cost of encoding the image portion is less than the second coding mode cost of encoding the image portion if it is detected that the one or more conditions are met, omit the computing of such a cost for the second-coding-mode for any motion information predictors of the set for which a cost for the second coding mode has not yet been computed, and otherwise computing of the cost for the second coding mode for at least one further motion information predictor for which the cost for the second coding mode has not yet been computed.

25. A non-transitory computer-readable storage medium comprising processor executable code for performing a method of determining encoding parameters for encoding, into a bitstream, a portion of an image of a video sequence, in which the image portion is being encoded by motion estimation with respect to at least one reference image portion, the encoding parameters for encoding the image portion include a coding mode and a motion information predictor for predicting motion information for obtaining the reference image portion, said method comprising:

selecting a coding mode to encode the image portion by motion estimation from at least a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes;

selecting a motion information predictor to encode the motion information of the image portion from the set of motion information predictors, each motion information predictor of the set being adapted for use in encoding of the image portion by motion compensation in at least the first and the second coding modes, wherein execution of the processor executable code by one or more processors causes the one or more processors to, for at least one image portion:

determine a first cost parameter value, representative of a cost of encoding the image portion using the first coding mode, for each of a number of motion information predictors of the set;

determine a second cost parameter value, representative of a cost of encoding the image portion using the second coding mode, for a motion information predictor for which the first cost parameter value is determined;

select a coding mode and a motion information predictor corresponding to the minimum cost parameter value from among the determined first and second cost parameter values, wherein the second cost parameter value is determined for another motion information predictor of the set unless a first predetermined condition is met, and wherein the first predetermined condition is that the value of the first cost parameter determined for the motion predictor is indicative of a cost less than the respective value of the second cost parameter determined for the motion information predictor.

26. A non-transitory computer-readable storage medium comprising processor executable code for performing a method of encoding a portion of an image into a bitstream, the method of encoding comprising determining encoding parameters for encoding, into a bitstream, a portion of an image of a video sequence, in which at least one image portion is being encoded by motion estimation with respect to a reference image portion, the encoding parameters for encoding the image portion include a coding mode and a motion information predictor for predicting motion information for obtaining the reference image portion, said method comprising selecting a coding mode to encode the image portion by motion estimation from a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes;

selecting a motion information predictor to encode the motion information of the image portion from the set of motion information predictors which is the same for the first and the second coding modes, wherein the selection of the coding mode and the motion information predictor involve comparing costs of encoding the image portion using the motion information predictors of the set in the first and second coding modes, wherein execution of the processor executable code by one or more processors causes the one or more processors for at least one image portion, to:

calculate for one of the motion information predictors of the set, the cost of encoding the image portion for the first coding mode and the cost of encoding the image portion for the second coding mode;

detect when one or more conditions are met, wherein the one or more conditions include a condition that, for the one of the motion information predictors of the set, the first-coding-mode cost of encoding the image portion is less than the second-coding-mode cost of encoding the image portion if it is detected that the one or more conditions are met, omit the computing of a cost for the second-coding-mode for any motion information predictors of the set for which a cost for the second coding mode has not yet been computed, and otherwise computing of the cost for the second coding mode for at least one further motion information predictor of the set for which the cost for the second coding mode has not yet been computed; and encode the image portion using the determined encoding parameters.

27. A non-transitory computer-readable storage medium comprising processor executable code for performing a method of encoding a portion of an image into a bitstream, in which the method of encoding comprises encoding parameters for encoding, into a bitstream, a portion of an image of a video sequence, in which the image portion is being encoded by motion estimation with respect to at least one reference image portion, the encoding parameters for encoding the image portion include a coding mode and a motion information predictor for predicting motion information for obtaining the reference image portion, said method comprising selecting a coding mode to encode the image portion by motion estimation from at least a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes;
  selecting a motion information predictor to encode the motion information of the image portion from the set of motion information predictors, each motion information predictor of the set being adapted for use in encoding of the image portion by motion compensation in at least the first and the second coding modes,
  wherein execution of the processor executable code by one or more processors causes the one or more processors, for at least one image portion, to:
  determine a first cost parameter value, representative of a cost of encoding the image portion using the first coding mode, for each of a number of motion information predictors of the set;
  determine a second cost parameter value, representative of a cost of encoding the image portion using the second coding mode, for a motion information predictor for which the first cost parameter value is determined;
  select a coding mode and a motion information predictor corresponding to the minimum cost parameter value from among the determined first and second cost parameter values; and
  encode the image portion using the determined encoding parameters, and
  wherein the second cost parameter value is determined for another motion information predictor of the set unless a first predetermined condition is met, and
  wherein the first predetermined condition is that the value of the first cost parameter determined for the motion predictor is indicative of a cost less than the respective value of the second cost parameter determined for the motion information predictor.

28. A method of encoding a portion of an image into a bitstream, the method comprising
  determining encoding parameters for encoding the image portion by motion estimation with respect to a reference image portion, into a bitstream, the image portion being encoded by motion estimation with respect to at least one reference image portion, the encoding parameters for encoding the image portion including a coding mode and a motion information predictor for predicting motion information for obtaining the reference image portion,
  selecting a coding mode to encode the image portion by motion estimation from at least a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes;
  selecting a motion information predictor to encode the motion information of the image portion from the set of motion information predictors, each motion information predictor of the set being adapted for use in encoding of the image portion by motion compensation in at least the first and the second coding modes; and
  encoding the image portion using the determined encoding parameters; and wherein
  determining said encoding parameters comprises:
    determining a first cost parameter value, representative of a cost of encoding the image portion using the first coding mode, for each of a number of motion information predictors of the set,
    determining a second cost parameter value, representative of a cost of encoding the image portion using the second coding mode, for a motion information predictors for which the first cost parameter value is determined, and
    selecting a coding mode and a motion information predictor corresponding to the minimum cost parameter value from among the determined first and second cost parameter values,
    wherein the second cost parameter value is determined for another motion information predictor of the set unless a first predetermined condition is met, and
    wherein the first predetermined condition is that the value of the first cost parameter determined for the motion information predictor is indicative of a cost less than the respective value of the second cost parameter determined for the motion information predictor.

29. An encoder for encoding a portion of an image into a bitstream, the encoder comprising:
  a device configured to determine encoding parameters for encoding, into a bitstream, a portion of an image of a video sequence, the image portion being encoded by motion estimation with respect to at least one reference image portion, the encoding parameters for encoding the image portion including a coding mode and a motion information predictor for predicting motion information for obtaining the reference image portion, the device comprising:
  a selection unit configured to select a coding mode to encode the image portion by motion estimation from at least a first coding mode which is a skip mode in which a block residual is not encoded and motion information is encoded using a set of motion information predictors and a second coding mode which is a merge mode in which a block residual may be encoded and motion information is encoded using a set of motion information predictors, the set of motion information predictors being the same for the first and second coding modes, and select a motion information predictor to encode the motion information of the image portion from the set of motion information predictors, each motion information predictor of the set being adapted for use in encoding of the image portion by motion estimation in at least the first and the second coding modes, the device further comprising a processing unit configured to:

determine a first cost parameter value, representative of a cost of encoding the image portion using the first coding mode, for each of a number of motion information predictors of the set; and being further configured to determine a second cost parameter value, representative of a cost of encoding the image portion using the second coding mode, for a motion information predictor for which the first cost parameter value is determined;

wherein the selection unit is configured to select a coding mode and a motion information predictor corresponding to the minimum cost parameter value from among the determined first and second cost parameter values; and wherein said encoder further comprises an encoding unit configured to encode the image portion using the determined encoding parameters, wherein the second cost parameter value is determined for another motion information predictor of the set unless a first predetermined condition is met, and wherein the first predetermined condition is that the value of the first cost parameter determined for the motion information predictor is less than the respective value of the second cost parameter determined for said motion information predictor.

* * * * *